US012332027B2

(12) United States Patent
Basche et al.

(10) Patent No.: US 12,332,027 B2
(45) Date of Patent: *Jun. 17, 2025

(54) SYSTEMS AND METHODS FOR COOPERATION BETWEEN CAMERAS AND CONDUCTED ELECTRICAL WEAPONS

(71) Applicant: Axon Enterprise, Inc., Scottsdale, AZ (US)

(72) Inventors: Todd Basche, Los Altos, CA (US);
Tyler Conant, Seattle, WA (US);
Gabriel Othman, Seattle, WA (US);
Nache Shekarri, Scottsdale, AZ (US)

(73) Assignee: AXON ENTERPRISE, INC., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,476

(22) Filed: Mar. 5, 2024

(65) Prior Publication Data

US 2024/0263921 A1 Aug. 8, 2024

Related U.S. Application Data

(63) Continuation of application No. 17/159,007, filed on Jan. 26, 2021, now Pat. No. 11,920,901, which is a (Continued)

(51) Int. Cl.
*F41H 13/00* (2006.01)
*F41G 9/00* (2006.01)
(Continued)

(52) U.S. Cl.
CPC .......... *F41H 13/0025* (2013.01); *F41G 9/00* (2013.01); *G06T 7/74* (2017.01); *G06V 40/10* (2022.01);
(Continued)

(58) Field of Classification Search
CPC ............. F41H 13/0025; F41H 13/0018; F41H 13/0012; F41H 13/0031; F41G 1/473;
(Continued)

(56) References Cited

U.S. PATENT DOCUMENTS 4,253,132 A 2/1981 Cover
7,444,940 B2 11/2008 Kapeles et al.
(Continued)

FOREIGN PATENT DOCUMENTS

| GB | 2029942 A | 3/1980 |
| WO | 2015189420 | 12/2015 |
| WO | 2018222058 A1 | 12/2018 |

*Primary Examiner* — Michael D David
(74) *Attorney, Agent, or Firm* — Andrew Graham

(57) ABSTRACT

Police officers use conducted electrical weapons ("CEWs") and cameras. A camera and a CEW may cooperate to improve the performance and use of the CEW and evidence collection by the camera. A camera and a CEW may also cooperate to improve the safety of the user and the target. Improvements may include improving targeting of the CEW, identifying and classifying body parts of the target as suitable or unsuitable for electrode deployment, adjusting electrode trajectory prior to launch, and automating electrode launch. Evidence collection may be improved by recording placement of electrodes on the target. Safety of the target may be improved by monitoring the movements of the target and altering characteristics of the delivered stimulus signal if potential harm to the target may occur.

20 Claims, 9 Drawing Sheets

Related U.S. Application Data continuation of application No. 16/387,135, filed on Apr. 17, 2019, now Pat. No. 10,900,754.

(60) Provisional application No. 62/658,730, filed on Apr. 17, 2018.

(51) Int. Cl.
    *G06T 7/73*     (2017.01)
    *G06V 40/10*     (2022.01)
    *H04N 7/18*     (2006.01)

(52) U.S. Cl.
    CPC ...... *H04N 7/185* (2013.01); *G06T 2207/30196* (2013.01); *G06T 2207/30204* (2013.01)

(58) Field of Classification Search
    CPC ...... F41G 9/00; G06K 9/00369; H04N 7/185; F41B 15/04; A01M 29/24; A01M 29/26
    USPC ............ 42/1.08; 89/1.11; 361/232; 102/502; 119/908
See application file for complete search history.

(56) References Cited

U.S. PATENT DOCUMENTS

| | | | |
|---|---|---|---|
| 7,886,648 B2 | 2/2011 | Williams et al. | |
| 8,540,155 B2 | 9/2013 | D'Urso et al. | |
| 9,310,163 B2 | 4/2016 | Bay | |
| 9,488,442 B2 | 11/2016 | Varga | |
| 9,816,789 B1 | 11/2017 | Hyde et al. | |
| 10,900,754 B1 * | 1/2021 | Basche | G06V 40/10 |
| 2006/0187610 A1 * | 8/2006 | Su | F41B 11/62 |
| | | | 361/232 |
| 2014/0118554 A1 * | 5/2014 | Bucknor | H04N 23/661 |
| | | | 348/155 |
| 2015/0153144 A1 * | 6/2015 | Cheatham, III | F41H 13/0025 |
| | | | 361/232 |
| 2018/0058825 A1 * | 3/2018 | Hyde | F41F 1/00 |
| 2018/0259303 A1 * | 9/2018 | Nerheim | F41H 13/0025 |
| 2019/0376768 A1 * | 12/2019 | Nerheim | F41H 13/0025 |
| 2022/0082357 A1 * | 3/2022 | Smith | F41H 13/0025 |

* cited by examiner

SYSTEMS AND METHODS FOR COOPERATION BETWEEN CAMERAS AND CONDUCTED ELECTRICAL WEAPONS

FIELD OF INVENTION

Embodiments of the present invention relate to cooperation between a conducted electrical weapon ("CEW") and one or more cameras.

BRIEF DESCRIPTION OF THE SEVERAL VIEWS OF THE DRAWING

Embodiments of the present invention will be described with reference to the drawing, wherein like designations denote like elements, and.

DETAILED DESCRIPTION OF INVENTION

Police officers have carried and used conducted electrical weapons ("CEWs") for years. Police now have access to and are using cameras (e.g., video cameras, capture systems, capture devices, recording devices, recording systems). Cameras include body cameras carried by or mounted to an officer (e.g., body-worn camera), cameras coupled to a CEW, cameras coupled to a vehicle (e.g., mounted) and/or cameras coupled to drones. Cameras record incidents, so that a video and audio record exist of what occurred at an incident. Even though body-worn cameras are separate from and operate independently of CEWs, body-worn cameras and CEWs that are capable of wireless communication may cooperate with each other to perform the functions of one or both devices.

One function of a CEW is to launch one or more electrodes toward a human or animal target to provide a stimulus signal (e.g., current, series of current pulses) through the target to impede locomotion of the target. Upon impact, the electrodes deliver current to a target in order to impede locomotion of the target. Electrodes may be wire-tethered to the CEW or the deployment unit of the CEW to provide the stimulus signal. The distance between the electrodes at a target may determine the effect of the current on the target. For example, electrodes that are positioned seven or more inches away from each other on the target increases the likelihood that the current will cause neuromuscular incapacitation ("NMI"). NMI occurs when the current from a CEW interferes with voluntary control of skeletal muscles by the target. Also referred to as lock-up or tetanus, NMI occurs when the current causes the muscles of the target to lock-up or to freeze so that the target cannot move his or her muscles, thereby interfering with locomotion of the target. The greater the distance between electrodes at the target, the greater the likelihood that the current will cause NMI. Electrodes that are positioned less than about 7 inches away from each other may not cause NMI, but may cause pain that convinces the target to stop moving.

A camera may be used to improve targeting of CEW electrodes. A camera may detect likely locations of impact of electrodes on the target. A camera, in cooperation with a CEW, may increase the likelihood that electrodes launched from a CEW will be spaced 7 or more inches away from each other at the target.

Figure 5:
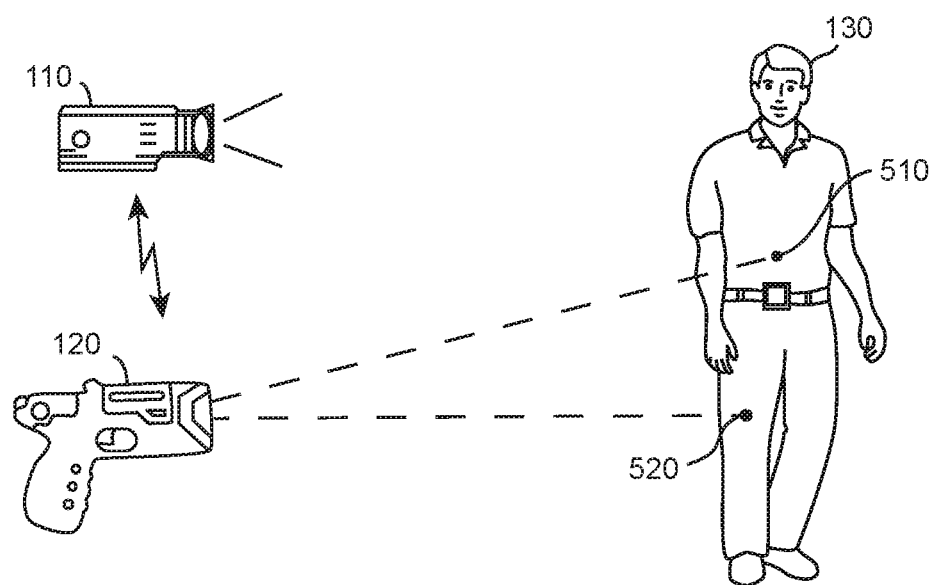
FIG. 5 is a diagram of a method for detecting a likely location of impact of a CEW electrode on a target.

For example, in the method of FIG. 5, a CEW uses a laser sight to project a beam of light for each of the one or more electrodes to be launched by the CEW. The intersection of the laser beams with the target identifies a location on the target that is the likely location of impact of the electrodes with the target.

A camera may detect the one or more spots created by the laser beams on the target at the likely locations of impact. The camera may further determine a distance, with respect to the target, between the likely locations of impact. The predicted distance between the electrodes provides information as to the likelihood that the current from the CEW will cause NMI.

Figure 6:
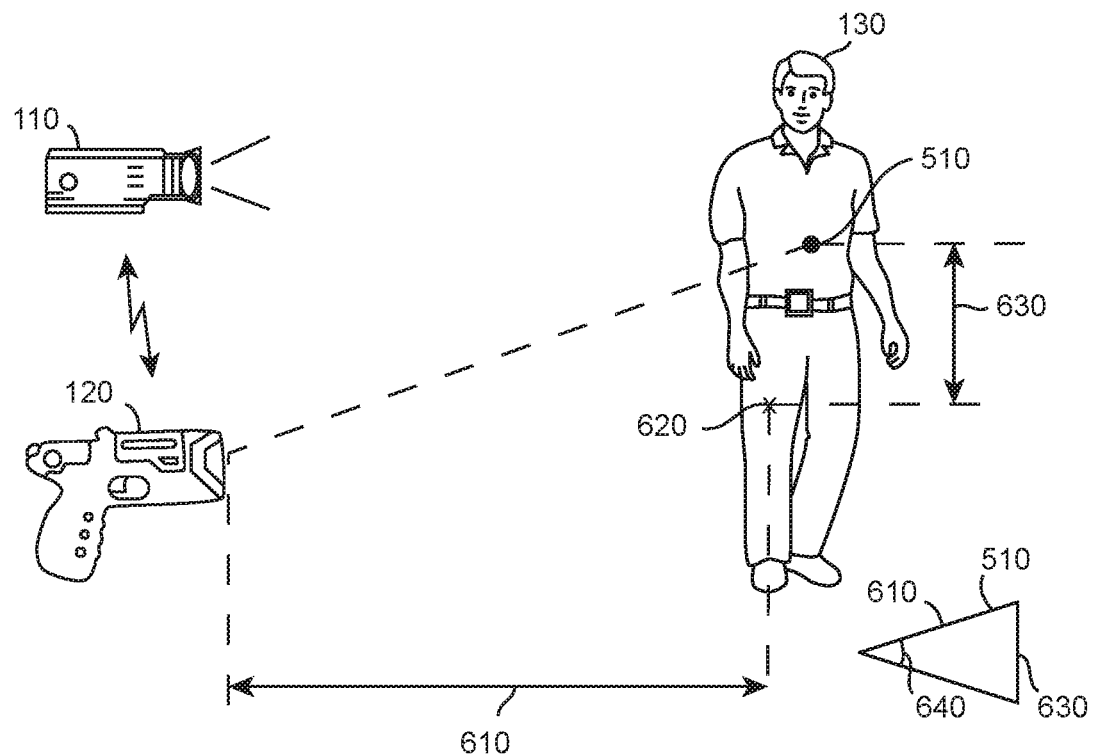
FIG. 6 is a diagram of another method for detecting a likely location of impact of a CEW electrode on a target.
Figure 7:
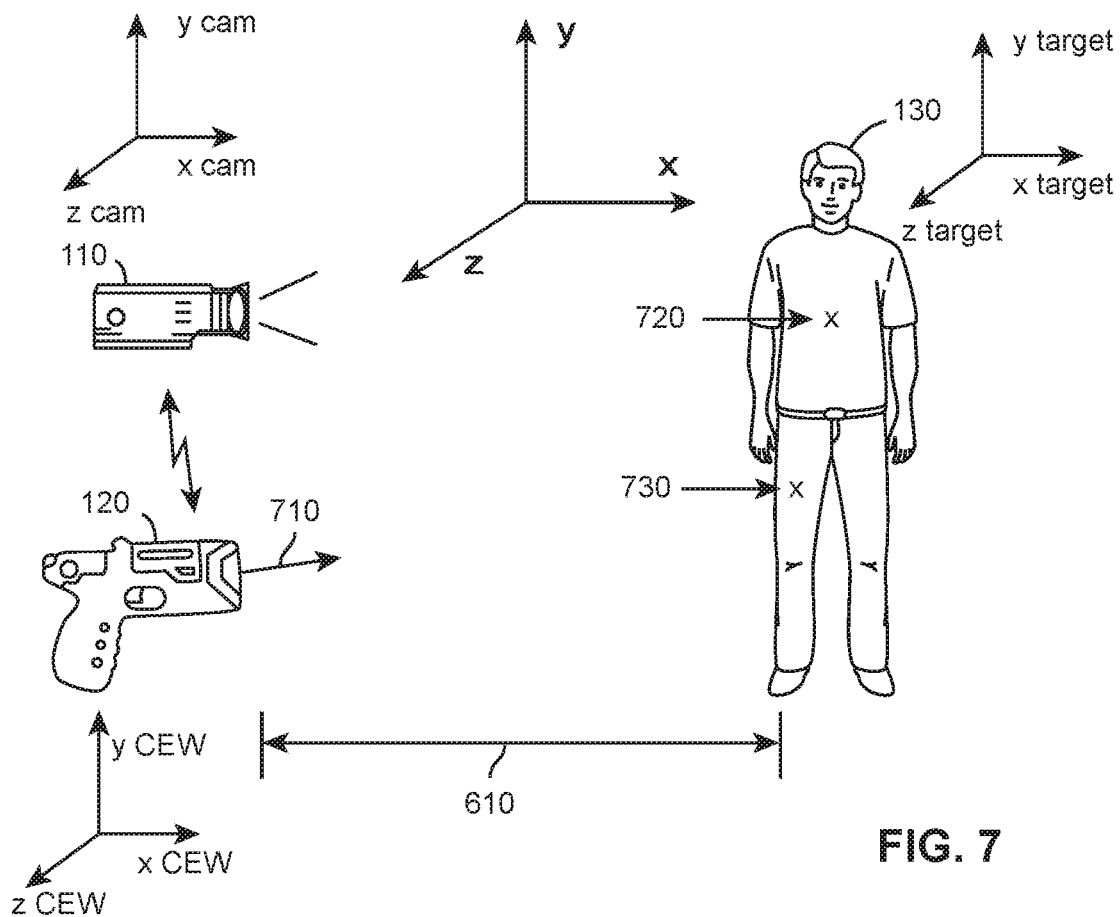
FIG. 7 is a diagram of another method for detecting a likely location of impact of a CEW electrode on a target.
Figure 10:
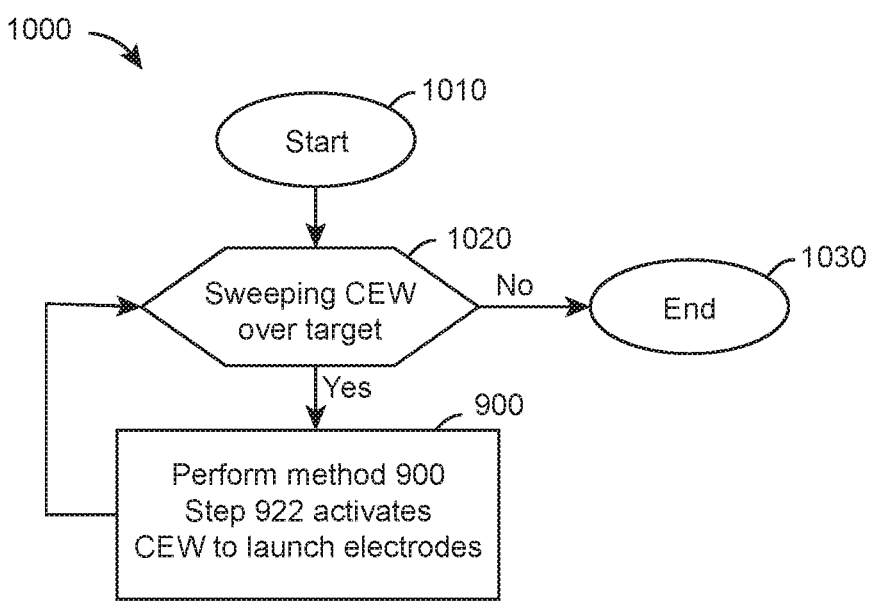
FIG. 10 is a method for automating launch of one or more electrodes from a CEW.

In another method shown in FIG. 6, the CEW uses a laser sight to project a single beam of laser light. The beam of laser light represents the likely location of impact of one electrode with the target. In a CEW that launches two electrodes, the laser sight may indicate the predicted location of impact of the top electrode or the bottom electrode. A camera may detect the spot created by the laser beam on the target. A camera may further determine the distance between CEW and target. A camera may determine the distance between CEW and target using any technique (e.g., stereoscopic cameras, laser range finder, radar, sonar). Generally, CEWs that launch two electrodes at the same time launch the electrodes along trajectories that have an angle between them. Some CEWs launch the top electrode at a trajectory that is parallel with the direction the CEW is oriented while the lower electrode is launched at a trajectory that is 8 degrees downward from the top trajectory. Knowing the angle between the electrode trajectories, the distance from the CEW to the target, and the location of the laser spot on the target, a camera may determine a likely location of impact of the second electrode on the target. The camera may further determine a distance, with respect to the target, between the likely locations of impact of the electrodes.

A camera with suitable identification algorithms may identify the various parts of the anatomy of a target. A camera may include algorithms for identifying the parts of the anatomy of various targets such as humans and different types of animals. A camera may classify (e.g., categorize) the suitability of the various parts of the anatomy of a target for receiving a force of impact of an electrode and/or the current from the CEW. One or more body parts of a target may be classified as suitable or unsuitable locations for receiving the force of impact of an electrode. One or more body parts of a target may be classified as suitable or unsuitable locations for receiving the current from a CEW. For example, a head would be classified as an unsuitable location of impact for an electrode. A thigh may be classified as a suitable location of impact and a suitable location to receive a current. Body parts may be classified to reduce potential harm to a target from the force of electrode impact and the current provided by the CEW.

After a camera has determined the likely location of impact of one or more electrodes on a target, the camera may determine the part of the anatomy that are the likely locations of impact. Knowing the parts of the body that are the likely locations of impact, the camera may determine the suitability of the parts of the body for impact and/or delivery of a current.

In the event that the likely locations of impact on the target correspond to suitable body parts for impact and/or delivery of current, the camera may provide a notice regarding the suitability of the targeted body parts. In an implementation, upon detecting that the targeted body parts are suitable, a camera may permit or even cause activation of the CEW to launch the electrodes.

In the event that one or more of the likely locations of impact on the target do not correspond to suitable (e.g., unsuitable) body parts for impact and/or delivery of current, the camera may provide a notice regarding the lack of suitability (e.g., unsuitability) of the targeted body parts. In an implementation, upon detecting that the targeted body parts are not suitable, a camera may prohibit the activation of the CEW to launch the electrodes.

In an emergency, an officer and/or a CEW may override the instructions provided by a camera to launch electrodes toward a target regardless of the suitability of the likely locations of impact of the electrodes on the target.

In another implementation, a camera may detect the position of suitable areas that are proximate to the unsuitable areas that are presently being targeted. A camera may provide information to enable a CEW to alter the trajectory of the electrodes so that the likely location of impact changes to correspond to suitable body parts. A CEW may use the targeting information provided by a camera to move the electrodes with respect to the CEW handle to change the trajectory of one or more electrodes as they are launched from the CEW. In an implementation, a camera may provide audible instructions to the user to change the orientation of the CEW to move the likely locations of impact to suitable body parts. In another implementation, the camera may provide information to a CEW so the CEW may adjust the trajectory of one or more electrodes without user intervention. A CEW may report to a camera when a requested change in trajectory is outside of the range of change that the CEW may make.

In an emergency, an officer and/or a CEW may override the instructions provided by a camera to launch electrodes toward a target regardless of the suitability of the likely locations of impact of the electrodes on the target.

Figure 1:
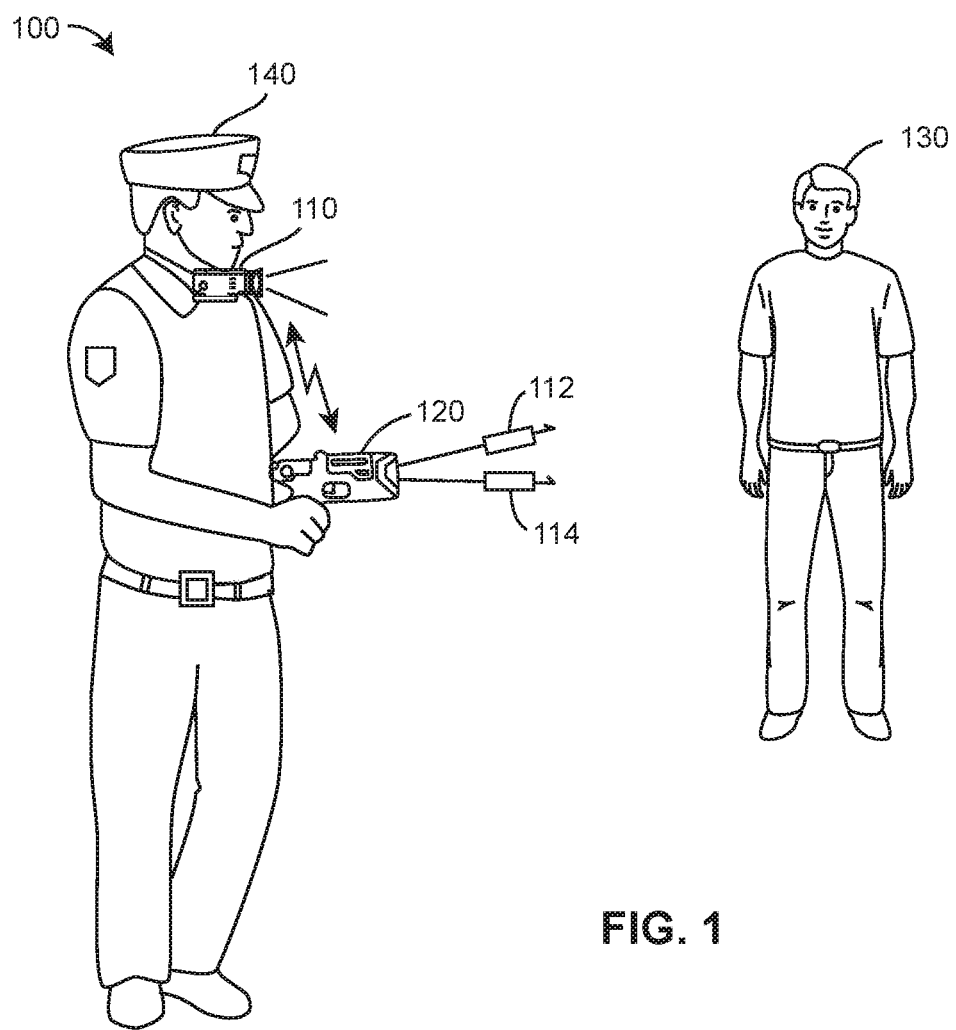
FIG. 1 is a diagram of a system for providing cooperation between a conducted electrical weapon ("CEW") and one or more cameras according to various aspects of the present disclosure.

For example, system 100 of FIG. 1 includes body-worn camera 110 and CEW 120. Body-worn camera 110 is mounted to officer 140. Officer 140 holds CEW 120. In this example, officer 140 aims CEW 120 toward target 130. Body-worn camera 110 may communicate wirelessly with CEW 120. Body-worn camera 110 may cooperate with CEW 120 to perform the functions or to assist in performing the functions of body-worn camera 110 and/or CEW 120. CEW 120 may launch electrodes 112 and 114 toward target 130 to deliver a stimulus signal through target 130.

In embodiments, a camera and a CEW are separate devices. For example, camera 110 and CEW 120 are disposed in physically discrete housings. Camera 110 and CEW 120 may be carried, deployed, oriented, operated, and otherwise used independently of each other.

Figure 2:
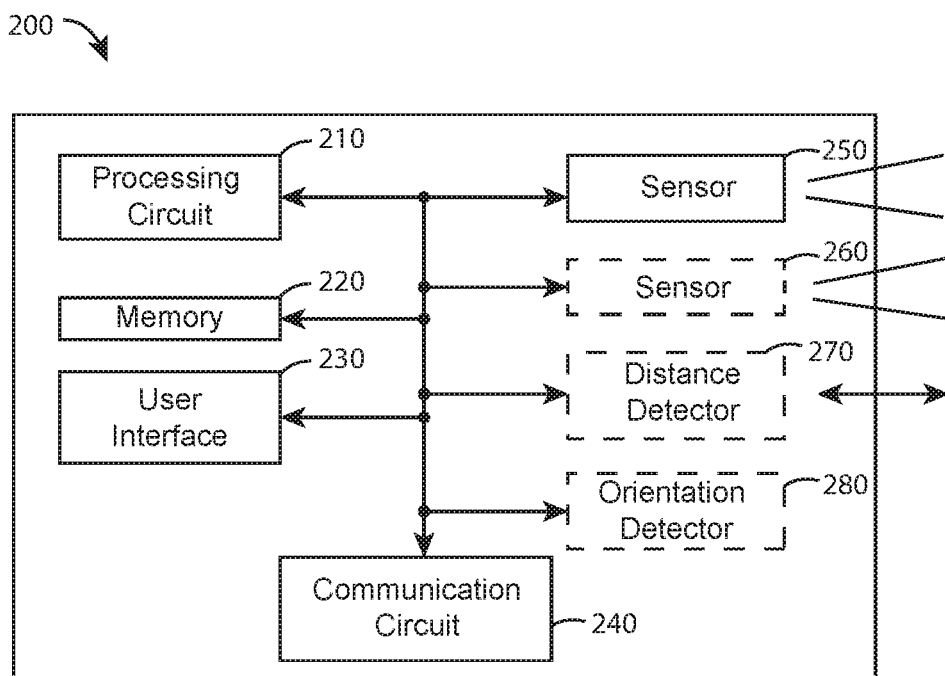
FIG. 2 is an implementation of a camera system according to various aspects of the present disclosure.
Figure 4:
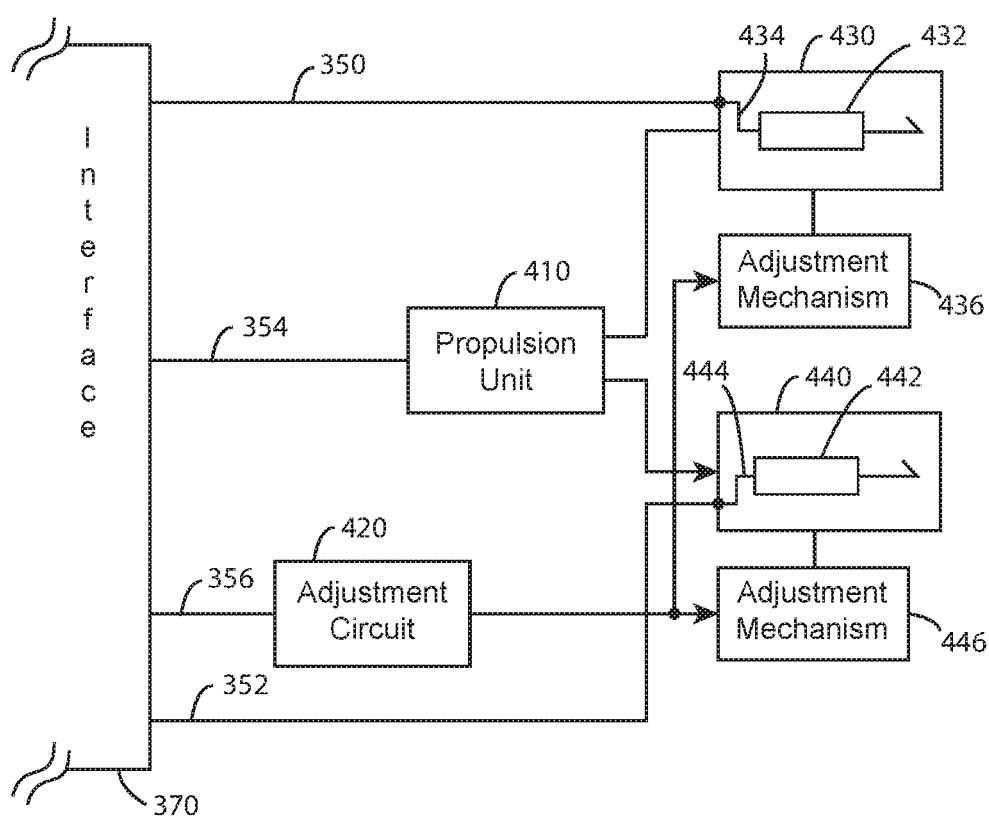
FIG. 4 is a diagram of a system for setting the trajectory of an electrode launched from a CEW.

An implementation of body-worn camera 110 includes body-worn camera 200 shown in FIG. 2. Body-worn camera 200 includes processing circuit 210, memory 220, user-interface 230, communication circuit 240 and sensor 250.

Sensor 250 may include at least one image sensor. Sensor 250 may capture image data. Processing circuit 210 may receive image data captured by sensor 250 and generate video data based on the received image data. In embodiments, sensor 250 may alternately or additionally capture image data and generate video data from the captured image data. Image data and/or video data may be provided to processing circuit 210 for processing. Image data and/or video data may be provided to memory 220 for storage.

Body-worn camera 200 may further include at least one of sensor 260, distance detector 270, and orientation detector 280. Sensor 260, distance detector 270 and orientation director 280 may be omitted to simplify body-worn camera 200 at the loss of some functions. Sensor 260 may include an audio sensor. For example, sensor 260 may include one or more microphones. Sensor 260 may generate audio data. Distance detector 270 may use any conventional means to determine the distance from camera 200 to target 130. For example, distance detector 270 may measure the distance via a laser projection onto target 130. One or more pulses of a laser may be emitted by distance detector 270 and a measure of distance to a target may be generated based on a time between emission and return of the one or more pulses reflected from the target. The color of laser light used by distance detector 270 may different from the color of the laser light used by CEW 120 so that distance detector 270 may distinguish between the laser beams provided by distance detector 270 and CEW 120. In other embodiments, distance detector 270 may alternately or additionally include a stereoscopic camera that determines a distance between the camera 200 and the target 130 and generates data associated with a measurement of the distance.

Orientation sensor 280 may provide a direction of orientation of camera 200. For example, orientation sensor 280 may provide a direction of rotation of the camera 200 about one or more of a vertical axis (y cam) from the camera 200 away from the ground, a longitudinal axis (x cam) toward a target from the camera 200 and perpendicular to the vertical axis, and a transverse axis (z cam) from a left side of the camera 200 to a right side of the camera 200 and perpendicular to the vertical axis and the longitudinal axis. In embodiments, a longitudinal axis may correspond to a direction from the camera toward a center of a field of view of an image sensor of the camera. A direction of orientation may include a positive or negative angle relative to an axis. Body-worn camera 200 may further include one or more power supplies coupled to provide electrical power to one or more components shown in FIG. 2, including processing circuit 210.

Processing circuit 210 may cooperate with sensors 250-260, distance detector 270, and orientation detector 280 to detect physical properties with respect to CEW 120 and target 130. For example, processing circuit 210 may determine a distance between the camera 200 and a target based on data received from distance detector 270. Processing circuit 210 may determine a direction of orientation relative to one or more of a longitudinal axis, transverse axis, or vertical axis of the camera based on data received from orientation sensor 280.

Processing circuit 210 may use detected physical properties to provide notices to CEW 120. Processing circuit 210 may use detected physical properties to provide instructions to CEW 120 to influence and/or control the operation of CEW 120. Processing circuit 210 may cooperate with communication circuit 240 to transmit messages, notices, and/or instructions to one or more electronic devices including CEW 120.

An implementation of CEW 120 includes CEW 300. CEW 300 includes processing circuit 310, memory 320, user interface 330, communication circuit 340, laser sight 342, stimulus signal generator 360, launch circuit 362, trajectory adjustment 364, interface 370 and handle 380. CEW 300 may further include sensor 302, sensor 304, distance detector 306 and orientation detector 308. Sensor 302, sensor 304, distance detector 306 and orientation detector 308 may be omitted to simplify CEW 120 at the loss of some functions.

Distance detector 306 may use any conventional means to determine a distance from CEW 300 to target 130. The distance may be a distance from a first electrode of the CEW to the target. For example, distance detector 306 may measure the distance via a laser projection onto target 130. One or more pulses of a laser may be emitted by distance detector 306 and a measure of distance may be generated based on a time between emission and return of the one or more pulses reflected from the target. The color of laser light used by distance detector 306 may be different from the color of the laser light used by laser sight 342 so that a camera and/or the CEW 300 may distinguish between the laser beams provided by distance detector 306 and the laser sight 342 of CEW 300. In embodiments, a laser sight 342 and distance detector 342 may be combined, wherein a single laser may be projected to both create a laser spot associated with a predicted location of impact and generate a measure of distance between the CEW 300 and the target 130. In other embodiments, distance detector 306 may alternately or additionally include a stereoscopic camera that determines a distance between the CEW 300 and the target 130 and generates data associated with a measurement of the distance.

Orientation sensor 308 may provide a direction of orientation of the CEW 300. For example, orientation sensor 308 may provide a direction of rotation of the CEW 300 about one or more of a vertical axis (y CEW) from the CEW 300 away from the ground, a longitudinal axis (x CEW) toward a target from the CEW 300 and perpendicular to the vertical axis, and a transverse axis (z CEW) passing from a left side of the CEW 300 to a right side of the CEW 300 and perpendicular to the vertical axis and the longitudinal axis. In embodiments, a longitudinal axis may correspond to a direction in which a first electrode travels upon launch from the CEW. In embodiments, a longitudinal axis may correspond to an axis along which a first electrode travels upon launch from the CEW. In embodiments, a direction of orientation of a CEW 300 about a longitudinal axis may correspond to and/or include a direction of orientation of a second electrode relative to a first electrode of the CEW about the longitudinal axis.

Processing circuit 310 may cooperate with communication circuit 340 to transmit and/or receive messages. Messages may be transmitted to one or more electronic devices including camera 200. For example, a message comprising indicia of at least one of a direction of orientation of a CEW, a distance between the CEW and a target, and an angle between a first electrode and a second electrode of the CEW may be transmitted via communication circuit 340. Messages, including notices and/or instructions, may be received from one or more devices such as one or more cameras 110. Processing circuit 310 may cooperate with launch circuit 362 and trajectory adjustment 364 to control the launch and trajectory of deployment units 390-392. Processing circuit 310 may cooperate with stimulus signal generator 360 to control and/or adjust one or more characteristics (e.g. amplitude, duration, number of pulses, pulse rate) of the stimulus signal delivered to target 130. Stimulus signal generator 360 may provide a stimulus signal (e.g., current) to interface 370 via conductors 350 and 352. A stimulus signal may include a pulsed current. The pulses of a stimulus signal may be provided at a pulse rate for a duration of time. A pulse may have an amplitude, that may vary with time or impedance, and a width. Launch circuit 362 and trajectory adjustment 364 may provide signals and/or information to interface 370 via signals 354 and 356 respectively.

Figure 3:
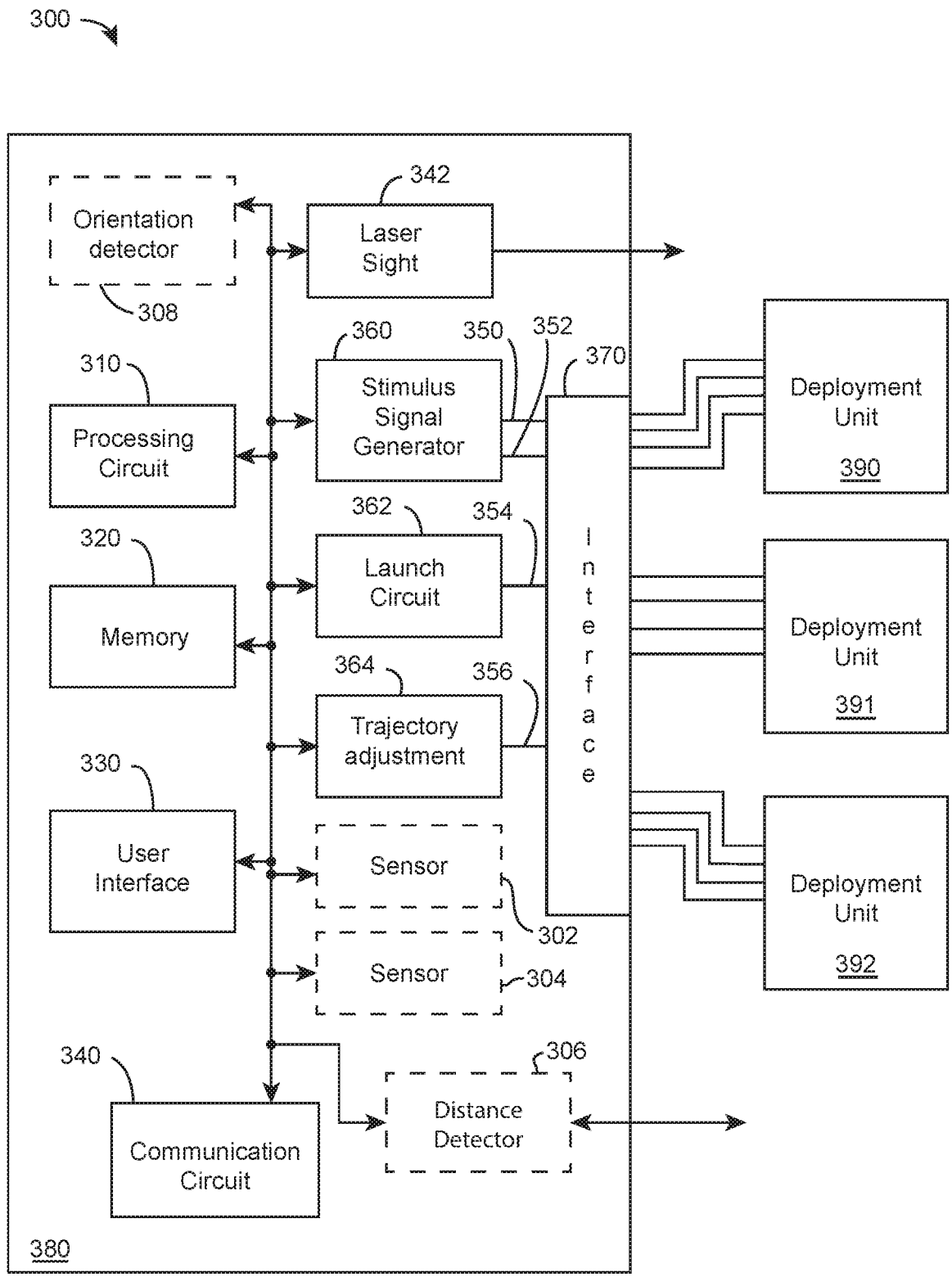
FIG. 3 is an implementation of a CEW according to various aspects of the present disclosure.

Conductors 350-356 may include one or more wires or a conventional bus. Deployment units may removably couple to interface 370. Portions of each conductor 350, 352, 354, and 356 may be coupled via interface 370. In CEW 300, deployment units 390, 391, and 392 couple to interface 370. After launching electrodes from a deployment unit, stimulus signal generator 360 may deliver a stimulus signal through interface 370 to one or more of the deployment units that have launched electrodes. The stimulus signal may be carried by wires that extend from a deployment unit to each electrode respectively. CEW 300 may further include one or more power supplies coupled to provide electrical power to one or more components of CEW 300 shown in FIG. 3, including processing circuit 310 and stimulus signal generator 360.

A camera detects (e.g., captures) physical properties in an environment. A camera records (e.g., stores) information (e.g., data) regarding the detected physical properties. Information that is captured and recorded is referred to herein as captured data. Captured data may be analyzed to determine characteristics of the physical properties detected and/or recorded.

Captured data may relate to an incident (e.g., event, occurrence). Captured data may provide a record of an incident. Captured data may be reviewed to provide a reminder of the incident. Captured data may be used as evidence to prove the occurrence of an incident. Captured data may be used as and referred to as evidence. In the context of law enforcement, a camera may include a body or body-worn camera configured to be carried by or mounted to an officer, a camera configured to be coupled to a CEW, a camera configured to be coupled to a vehicle and/or a camera configured to be coupled to drones.

A camera may detect and record visual (e.g., video, related to light) physical properties and/or audible (e.g., audio, related to sound) physical properties. Visual and audible detected properties may be referred to as audiovisual data, together, or video data and audio data respectively. As used herein, "audiovisual" information, data, or recordings refers to video that includes audio, video that is associated with separate audio of the video scene, or audio alone. Use of the term video data may refer to both video and audio data together.

Visual and/or audible physical properties detected and recorded may be within the range of vision and/or hearing of a human. Visual and/or audible physical properties detected and recorded may be outside the range of vision and/or hearing of a human. The capture and storing of video and/or audio data may be accomplished using any suitable technique.

A camera may create an audiovisual record. Data stored by a capture system may be stored in any suitable format, including but not limited to H.264, MPEG-4, AAC, and WAV. A capture system may convert the captured data from one format (e.g., analog data, encoding) to another format (e.g., digital data, encoding).

A camera may communicate (e.g., transmit, receive) with another electronic device via a wireless communication link. A camera may communicate with a network and via the network with another electronic device. A camera may communicate with a network using a communication protocol.

A camera may include any conventional communication circuitry for transmitting and/or receiving data. A camera may use any conventional wired (e.g., LAN, Ethernet) or wireless communication protocol (e.g., BLUETOOTH, BLUETOOTH LOW ENERGY, WIFI, ZIGBEE, 2G, 3G, 4G, WIMAX). A camera may store captured data for a period of time. A camera may transmit captured data to another system. A recording system may transmit captured information to another system shortly after capture (e.g., live streaming).

A camera may capture and provide data in addition to audiovisual information, such as a camera identifier, the operator of the camera, an identifier of the incident captured, date of capture, camera orientation, and geographic location of the camera. Additional data may be provided as metadata to the audiovisual data.

A processing circuit includes any circuitry and/or electrical/electronic subsystem for performing a function. A processing circuit may include circuitry that performs (e.g., executes) a stored program. A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored and/or manipulated by the processing circuit may be used to perform a function and/or to perform a stored program.

A processing circuit may have a low power state in which only a portion of its circuits operate or it performs only certain functions. A processing circuit may be switched (e.g., awoken) from a low power state to a higher power state in which more or all of its circuits operate and/or it performs additional certain functions or all of its functions.

A processing circuit may control the operation and/or function of other circuits and/or components of a system. A processing circuit may receive status information regarding the operation of other components, perform calculations with respect to the status information, and provide commands (e.g., instructions) to one or more other components for the component to start operation, continue operation, alter operation, suspend operation, or cease operation. Commands and/or status may be communicated between a processing circuit and other circuits and/or components via any type of bus including any type of conventional data/address bus.

A processing circuit may process received data to generate additional data. For example, a processing circuit may process image or video data from an image sensor to detect objects within a field of view captured in the image or video data. An outline, bounding box, or other data indicating pixels of image data associated with a detected object may be generated as additional data by the processing circuit. The generated data may be used in subsequent processing, including to determine whether a predicted location of impact corresponds to a suitable location.

Detecting objects may include classifying the object. An object may be classified based on further processing of image data by the processing circuit. Classifications of objects may be generated as additional data by a processing circuit. For example, a processing circuit may detect a first object and classify the object as a human or animal. A processing circuit may further classify portions of an object that has been classified as a human or animal. For example, body parts of a human or animal object may be classified by a processing circuit. The generated classification data may be used in subsequent processing, including to determine whether a predicted location of impact corresponds to a suitable location. Classification may include application of one or more machine learning models stored in memory on the camera, wherein the machine learning models have been trained to classify one or more objects or portions of objects in captured image or video data.

A processing circuit may also detect other objects captured in video or image data. The other objects may be second objects. The second objects may be classified as non-living objects. The second objects may be classified as particular types of non-living objects. For example, a processing circuit may classify a second object as one or more of a wall, desk, chair, table, watch, pole, umbrella, briefcase, or article of clothing. Classification of second objects may include application of one or more machine learning models stored in memory on the camera, wherein the machine learning models have been trained to classify one or more second objects in captured image or video data.

As understood by one of ordinary skill in the art, a memory as described herein may be any suitable device configured to store data (e.g., information) for access by a processing circuit (e.g., computing device). A memory receives data. A memory retains (e.g., stores) data. A memory retrieves data. A memory provides data for use by a system, such as a processing circuit. A memory may organize data for storage. A memory may organize data as a database for storage and/or retrieval. The operations of organizing data for storage in or retrieval from a database of a memory may be performed by a memory. A memory may include a repository for persistently storing and managing collections of data. A memory may store files that are not organized in a database.

An example of a memory which includes reliable storage but also low overhead, is a file system or database management system that stores data in files (e.g., records) on a computer-readable medium such as flash memory, random access memory (RAM), or hard disk drives.

Memory 220 and 320 perform the functions of a memory discussed herein. A memory may be implemented using any computer-readable medium. A processing circuit (e.g., 210 and 310) may access memories 220 and 320 locally (e.g., via a data bus), over a network, and/or as a cloud-based service.

One of ordinary skill in the art will recognize that separate memories described herein may be combined into a single memory, and/or a single memory described herein may be separated into multiple memories, without departing from the scope of the present disclosure.

In embodiments, a memory includes at least one non-transitory computer-readable storage medium having computer-readable instructions stored thereon that, when executed by a least one processing circuit of a device, cause the device to perform one or more steps. For example, memory 220 may include a non-transitory computer-readable storage medium having computer-readable instructions stored thereon that, when executed by processing circuit 210 of camera 200, cause the camera 200 to perform functions or steps. In embodiments, memory 320 may include a non-transitory computer-readable storage medium having computer-readable instructions stored thereon that, when executed by processing circuit 310 of CEW 300, cause the CEW 300 perform functions or steps.

A communication circuit transmits and/or receives information (e.g., data). A communication circuit may transmit and/or receive (e.g., communicate) information via a wireless and/or wireless communication link. A communication circuit may communicate using wireless (e.g., radio, light, sound, vibrations) and/or wired (e.g., electrical, optical) mediums. A communication circuit may communicate using any wireless (e.g., BLUETOOTH, ZIGBEE, WAP, WIFI, NFC, IrDA, LTE, BLE, EDGE, EV-DO) and/or wired (e.g., USB, RS-232, Firewire, Ethernet) communication protocol. A communication circuit operable or configured to transmit and/or receive information over a wireless medium and/or via a wireless communication protocol may include a wireless communication circuit.

A communication circuit may receive information from a processing circuit for transmission. A communication circuit may provide received information to a processing circuit.

A communication circuit in one device (e.g., camera system) may communicate with a communication circuit in another device (e.g., CEW). Communications between two devices may permit the two devices to cooperate in performing a function of either device. For example, as discussed above, a camera may detect a target and provide information to a CEW regarding the target. A CEW may use the information to perform a function, alter the performance of a function, or cease performing a function. A CEW may provide information to a camera. The camera may perform a function, alter the performance of a function, or cease performing a function responsive to the information.

A user interface provides an interface between a user and an electronic device. A user interface enables communication between a user and an electronic device. A user interface enables a human user to interact with an electronic device. A user may control, at least in part, an electronic device via the user interface. A user may provide information and/or commands to an electronic device via a user interface. A user may receive information and/or responses from the electronic device via the user interface.

A user interface may include one or more controls that permit a user to interact and/or communicate with a device to control (e.g., influence) the operation (e.g., functions) of the device. A control includes any electromechanical device for operation by a user to establish or break an electrical circuit. A control may include a portion of a touch screen. A control may include a switch. A switch includes a pushbutton switch, a rocker switch, a key switch, a detect switch, a rotary switch, a slide switch, a snap action switch, a tactile switch, a thumbwheel switch, a push wheel switch, a toggle switch, and a key lock switch (e.g., switch lock). Operation of a control may occur by the selection of a portion of a touch screen.

A user interface may provide information to a user. A user may receive visual, haptic (e.g., tactile, kinesthetic), and/or audible information from a user interface. A user may receive visual information via devices (e.g., indictors) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed. A user interface may include a communication circuit for transmitting information to an electronic device for presentation to a user. For example, a user interface may wirelessly transmit information to a smart phone for presentation to a user on the display of the smart phone.

A user interface may include voice to text or voice to instruction so that a user may interact with the user interface verbally (e.g., by voice).

As discussed above, body-worn camera 110 and CEW 120 may cooperate to determine the likely location of impact of electrodes 112 and 114 on target 130. Body-worn camera 110 may further cooperate with CEW 120 to assist in targeting (e.g., aiming) the delivery of electrodes toward a target from CEW 120.

In an implementation, CEW 120 may include laser sights that project laser spots 510 and 520 onto target 130 as shown in FIG. 5. In embodiments, each laser spot may be projected by a separate laser sight. A single laser sight may only project a single laser spot. Laser spots 510 and 520 correspond to the likely locations of impacts of electrodes 112 and 114 respectively on target 130. A first laser sight of CEW 120 may project laser spot 510 on a target. A second laser sight of CEW 120 may project laser spot 520 on a target. A laser sight of a CEW may be projected prior to launch of one or more electrodes. A laser sight of a CEW may be projected upon receipt of input at a CEW. For example, deactivation of a safety on a CEW may activate one or more laser sights of the CEW. Upon projection of a laser sight, a CEW may provide at least one message via a communication circuit to a camera indicting that the CEW is projecting the laser sight.

Camera 110 may detect laser spots 510 and 520 on target 130. For example, camera 110 may detect an object corresponding to a human or animal. Camera 110 may further detect one or more pixels on image data associated with laser spots 510 and 520 within a boundary box associated with the detected human or animal object. The pixels may be associated with laser spots 510,520 based on one or more predetermined colors of the pixels. Other manners of detection of the laser spots 510, 520 may be alternately or additionally employed as well. Detecting laser spots 510 and 520 may include detecting the at least one message from the CEW via a communication circuit, separate from an image sensor, the at least one message indicating that the CEW is projecting the laser sight. Detection of such spots 510,520 on an object may identify a detected object as the target 130.

A human or animal associated with one or more spots 510,520 may be detected as the target 130 among other objects detected in image data captured by the camera 110. In embodiments, camera 110 may begin detecting objects in image data prior to receiving the at least one message and/or prior to detecting a laser spot in image data captured by the camera. By detecting objects in advance, a camera in embodiments according to various aspects of the present disclosure may be able to rapidly determine whether a location of a laser spot corresponds to a suitable location. By detecting objects in advance, orientation of a CEW toward a target and detecting of objects by the camera may occur in parallel, rather than in series where a body part may be only detected after a laser spot is positioned on a target.

Camera 110 may determine the distance between the laser spots on target 130. The distance may correspond to a first predicted location of impact of a first electrode and a second predicted location of impact of a second electrode. The distance may be determined in various manners. For example, the distance may be determined based on a ratio of a size of a predetermined object in image data captured by the data and a distance between pixels of the laser spots. The predetermined object may be a CEW. A size of the predetermined object may be stored on the camera, enabling the camera to determine the distance based in a ratio of a size of the predetermined object in the image data and a distance between the locations of the laser spots in the image data.

In other embodiments, the distance between the laser spots may be determined based on the distance between one of the camera and the target and the distance between a CEW and the target. Each such distance may be detected by a distance detector incorporated in the respective device. The distance between the laser spots may also be determined in part based on an angle between the laser spots at which the respective lasers are projected. The angle between laser spots may correspond to an angle between a first electrode and second electrode. The angle between laser spots may correspond to an angle between a first electrode and second electrode at which the first and second electrodes are configured to be launched. The angle between the spots may be associated with an increase in a first distance between electrodes as the electrodes travel a second distance in a second direction, such that the distance between two electrodes at a target may be determined or estimated for given distance between the source of the electrodes (e.g., the CEW) and the target. For example, the distance may be determined by multiplying a measured distance to a target by a value of a tangent function of the angle between the first electrode and second electrode. Additional angles, distances, constant values, functions, and/or assumptions may be received, determined, and/or otherwise employed by the camera to determine a distance between two laser spots. Such additional information may include one or more of a distance measured along each projected laser to the target by the CEW; a direction of orientation of the CEW about a transverse axis of the CEW; and a size of the target. Such information may be determined by the camera and/or indicia of such information may be transmitted by a CEW and received by a camera. In embodiments, indicia of at least one of a direction of orientation of the CEW, a distance between the CEW and the target, an angle between a first and second laser spot, and an angle between a first electrode and second electrode may be received from the CEW. In embodiments, an angle between a first and second laser spot may correspond to an angle between a first electrode and second electrode. A distance between the laser spots may be determined by the camera based on the indicia received from the CEW. Other manners of determining a distance based on inputs directly detected, captured, or otherwise received by the camera may alternately or additionally be employed as well. Alternate or additional manners of determining distance may also be employed by the camera in embodiments of the invention to determine the distance, including those that do not include an angle or a distance determined by and/or shared between a camera or CEW.

In accordance with the distance between laser spots 510 and 520, camera 110 and/or CEW 120 may determine a likelihood that a stimulus signal delivered at the locations indicated by laser spots 510 and 520 will result in NMI. Determining a likelihood of NMI may involve comparing the distance determined by the camera to a threshold. If a determined distance is less than a threshold, a location of a first laser spot may be determined to be an unsuitable location of impact for a first electrode associated with the first laser spot. If a determined distance is less than a threshold, a location of a second laser spot may be determined to be an unsuitable location of impact for a second electrode associated with the first laser spot. If a location is determined to be unsuitable, camera 110 may provide an instruction to adjust at least one of the electrodes. The instruction may include an instruction to increase an angle between a first electrode and a second electrode. The instruction may include an instruction to adjust a second electrode.

In embodiments, an instruction may be transmitted to the CEW to automatically adjust an orientation of a second electrode. The first electrode may be disposed, provided, or otherwise retained in a fixed orientation, such that only the second electrode is configured to be adjusted in the CEW based on the instruction from the camera. In embodiments, a distance may be determined, compared with a threshold, and an instruction may be transmitted to a CEW until the determined distance is equal or greater than the threshold. In other embodiments, the instruction may include an angle of adjustment necessary to adjust an electrode in order for the determined distance to equal or exceed a threshold prior to launch of one or more electrodes. In embodiments, a threshold may be a distance of seven inches, twelve inches, or greater than twelve inches.

Camera 110 may capture images of the location of laser spots 510 and 520 on target 130. Camera 110 may use the images that include the locations of laser spots 510 and 520 to determine where on the anatomy of target 130 electrodes 112 and 114 likely will strike.

In another implementation, CEW 120 may include a single laser sight that projects laser spot 510 onto target 130. Laser spot 510 corresponds to the likely location of impact of electrode 112 on target 130. Camera 110 and/or CEW 120 measures distance 610 to target 130. Any technique may be used to measure distance 610. Electrode 114 is launched from CEW 120 at an angle (e.g., angle 640) with respect to trajectory of electrode 112. The trajectory of electrode 114 is positioned at an angle with respect to the trajectory of electrode 112 so that the trajectories diverge to place electrodes 112 and 114 a distance (e.g., spread) 630 apart on target 130. In embodiments, the angle 640 may correspond to an increase in distance along a vertical axis as a distance along a longitudinal axis increases, such that a distance 630 may be determined based on this increase for a distance 610. As discussed above, distance 630 may be determined in various manners, including based on a distance to a target detected by the camera or CEW and target and an angle between first and second electrodes. The angle and/or distance may be determined by the camera and/or received by the camera from the CEW. The CEW may determine (e.g., read, detect) an angle from a given deployment unit and transmit the determined angle to a camera. In other embodiments, a camera may store a default value for an angle between a first and second electrode. The stored default value may be read from memory and applied to determine a distance between a first predicted location of impact and a second predicted location of impact. In embodiments, a distance between a predicted first location of impact and a second location of impact may be determined independent of any laser spots projected on a target from laser sights by a CEW. The distance may be determined when a number of projected laser spots is less than a number of electrodes configured to be launched from one or more deployment units by a CEW. As discussed above, the greater the distance between the electrodes the greater the likelihood of inducing NMI.

In accordance with the distance 630, camera 110 and/or CEW 120 may determine a likelihood that a stimulus signal delivered to target 130 by electrodes 112 and 114 spaced apart by distance 630 will result in NMI. Determining a likelihood of NMI may involve comparing the distance determined by the camera to a threshold. If a determined distance is less than a threshold, a location of a first laser spot may be determined to be an unsuitable location of impact for a first electrode associated with the first laser spot. If a determined distance is less than a threshold, a predicted location of impact of a second electrode may be determined to not correspond to a suitable location.

If a location is determined to be unsuitable, camera 110 may provide an instruction to adjust at least one of the electrodes. The instruction may include an instruction to increase an angle between a first electrode and a second electrode. The instruction may include an instruction to adjust a second electrode. The instruction may include an instruction to adjust a second electrode and not adjust a first electrode. The instruction may include an instruction to adjust only one electrode of a plurality of electrodes. The first electrode may be associated with the spot 510, while the second electrode is not associated with a spot or other visual indicator that may be captured by a camera. A second predicted location of impact may be detected without or independent of a second laser spot being projected for a second electrode.

In embodiments, the instruction may be transmitted to the CEW to automatically adjust an orientation of only a second electrode. A first electrode, such as electrode 112, may be disposed, provided, or otherwise retained in a fixed orientation, such that only the second electrode may be adjusted in the CEW based on the instruction from the camera. In embodiments, a distance may be determined, compared with a threshold, and an instruction may be transmitted to a CEW from the camera until the determined distance is equal or greater than the distance threshold. In other embodiments, the instruction may include an angle of adjustment necessary to adjust an electrode in order for the determined distance to meet or exceed the threshold distance prior to launch of one or more electrodes. The threshold may correspond to seven inches, twelve inches, or a distance greater than twelve inches.

However, camera 110 needs additional information to determine whether electrode 114 will impact target 130.

Camera 110 may capture images of the location of laser spot 510 on target 130, but camera 110 cannot determine whether electrode 114 will strike target 130 because camera 110 does not have information as to the orientation of CEW 120, which determines the trajectory of electrode 114 with respect to the trajectory of electrode 112. Camera 110 may superimpose a circle having a radius equal to distance 630 centered at the location of laser spot 510 to determine the possible locations of likely location of impact 620 on target 130. A circle may be superimposed on image or video data within the camera. However, lacking further information, camera 110 cannot determine whether electrode will strike target 130. CEW 120 may provide camera 110 information regarding the orientation of the trajectory of electrode 114 with respect to the trajectory of electrode 112. The information may include an angle or direction of rotation of CEW 120 and/or electrode 114 about a longitudinal axis of the CEW 120. For example, CEW may detect its own orientation and report that the trajectory of electrode 114 is 45 degrees clockwise (e.g., NE of laser spot 510) of the trajectory of electrode 112. In other embodiments, where a rotational position of electrode 114 is adjustable relative to CEW 120, the CEW 120 may report a direction of orientation of the electrode 114. Using distance 630 and orientation information from CEW 120, camera 110 may determine where on the circle around laser spot 510 electrode 114 is likely to impact. Referring to FIG. 6, the orientation of electrode 114 is about 180 degrees clockwise (e.g., south) of electrode 112, so location 620 is positioned almost straight below laser spot 510.

In other embodiments, a predicted location of impact of a second electrode may be determined directly based on a received direction of orientation, independent of and/or without a circle being imposed on image data. For example, a set of possible locations of impact that form a circle at which a second electrode may impact a target may be determined and stored in memory, without or independent of superimposing any such locations on image data. In other embodiments, a second predicted location may be directly determined upon receipt of all necessary data, rather than first determining a set of possible locations from which a specific predicted location of impact is subsequently detected.

Camera 110 may use information regarding the location of laser spot 510 on target 130, distance 630, and the orientation of CEW 120 to determine where on the anatomy of target 130 location 620 may fall. Camera 110 may further determine where on the anatomy of target 130 electrodes 112 and 114 likely will strike. Accordingly, the predicted locations of impact of multiple, different electrodes may be determined based on a single laser sight of a CEW. Predicted locations of impact of multiple, different electrodes may be determined through the detection of only one laser spot projected by a CEW and captured in image data by a camera. Such an arrangement may decrease a complexity of operating a CEW, enabling a single laser sight and a single laser spot to be projected and aimed by a user. A need for aiming a second laser sight and second laser spot may be avoided. Yet, a precision and effectiveness of a second, unsighted electrode may be maintained. A complexity of operation of a CEW may be decreased, while an accuracy and safety of at least one second electrode may be retained or improved, even though the at least one second electrode is not associated with a projected laser spot that shows a location of impact of the second electrode prior to launch.

Any information detected and/or determined by CEW 120 that cannot be detected and/or determined by camera 110 may be communicated from CEW 120 to camera 120 and vice versa. Because information may be communicated between camera 110 and CEW 120, either or both devices may use detected information to perform calculations to determine further information. Calculated information may also be communicated between camera 110 and CEW 120.

For example, if CEW 120 detects distance 610 and camera 110 is incapable of detecting distance 610, distance 610 as detected by CEW 120 may be communicated to camera 110 so that camera 110 may calculate distance 630. It may be difficult for camera 110 to determine the orientation of CEW 120, so CEW may determine its own orientation and report the information to camera 110.

In another implementation, CEW 120 may use orientation detector 308 to determine its own location and orientation in space. Camera 110 may also use orientation detector 280 to determine its own location and orientation in space. Camera 110 and CEW 120 may communicate to each other their respective locations and orientations. The trajectory 710 of electrode 112 may be determined from the orientation of CEW 120. Camera 110 may determine the location of target 130 with respect to its own location and orientation. At least one of camera 110 and CEW 120 may measure the distance 610 to target 130. CEW 120 and/or camera 110 may use a combination of orientation in space, distance 610, and trajectory 710 to determine the likely location of impact 720 of electrode 112 on target 130. Camera 110 and/or CEW 120 may further use the angle between electrode 112 and electrode 114 to determine the likely location of impact 730 on target 130.

As discussed above, camera 110 and CEW 120 may cooperate to determine likely locations of impact of electrodes on a target. Camera 110 may further identify the parts of the anatomy of a target. Camera 110 and/or CEW 120 may classify the parts of the anatomy of a target. Classification of the parts of the anatomy of a target may include classifying the parts of the anatomy as to the safety of impact with electrodes. Classification may include classifying the parts of the anatomy as to the safety of delivery of a stimulus signal. Classification may include classifying the parts of the anatomy as to the likelihood of inducing NMI in the target.

In an implementation, camera 110 may detect and identify body parts of target 130. For example, body parts of a human target identified by camera 110 may include head 810, eyes 812, arms 830, heart area 820, rib area 821, shoulders 820, hands 830, thighs 842, calves, buttocks, abdomen 840, and feet 860. Camera 110 may classify body parts as at least one of suitable and unsuitable with respect to impact, delivery of a stimulus signal, and inducing NMI.

Suitability for impact may include factors such as electrode coupling (attachment) to the target, clothing generally worn over the body part, and permanency of damage done by an electrode to the body part.

Suitability for a stimulus signal may include factors such as clothing generally worn over the body part, proximity of metal (e.g., belt buckle, keys in pocket, ring on finger), and proximity to organs.

Suitability for inducing NMI may include factors such as amount of skeletal muscle in the body part and the amount of skeletal muscle between two electrodes on the target.

A suitable body part may include those body parts that facilitate electrode attachment, facilitate delivery of the stimulus signal into target tissue, and the proximity or amount of skeletal muscle. Suitable body parts for the perspective of impact, delivery of the stimulus signal, and/or inducing NMI include stomach, thighs, buttocks, and calves, arms, hands, and shoulders.

Unsuitable body parts include body parts (e.g., eye) that may suffer long-term injury by the impact of the electrode. An unsuitable body includes body parts (e.g., heel, ribs) to which an electrode has difficulty adhering or delivering a stimulus signal. For example, unsuitable body parts from the aspect of injury includes head 810 and eye 812. Rib area 821 and feet 860 may be examples of bony body parts which do not allow for good electrode attachment and delivery of stimulus signal. A body part may be suitable for electrode attachment, stimulus signal delivery, and inducing NMI, but may be classified as unsuitable for other reasons. For example, particular body parts (e.g., genitals, breasts, chest) may be classified as unsuitable because the public perceives the attachment of electrodes or delivery of stimulus signal to those body parts as unacceptable or dangerous.

In addition to body parts, camera 110 may detect and identify other aspects of target 130 that may affect the assessment as to suitability for receiving electrodes to deliver a stimulus signal. For example, cameras 110 may detect and identify items such as clothing, belts, jackets, shoes, watches, umbrellas, briefcases, knee pads, hats, and helmets. In order to deliver a stimulus signal to target 130, the electrodes must be positioned proximate to target tissue. Some types of clothing (e.g., winter coats, shoes, gloves) may prevent electrodes from getting close enough to target tissue to deliver the stimulus signal. Other items (e.g., briefcase, purse, umbrella) may be blocking the suitable parts of the target's anatomy or may cover enough of the target that suitable electrode spread cannot be achieved. Clothing may also provide signs of where electrodes may best be positioned. For example, delivering one electrode above the belt and another below the belt achieves delivery to acceptable body parts.

After classifying body parts as at least one of suitable and unsuitable, camera 110 may compare likely locations of impact for one or more electrodes to the detected suitable body parts. If likely locations of impact correspond to suitable body parts, camera 110 may transmit a message (e.g., notice) regarding the suitability of the likely locations of impact.

In embodiments, a likely or predicted location of impact of an electrode may be determined to correspond or not correspond to a suitable location based on one or more of whether the likely or predicted location corresponds with a suitable body part and/or a determined distance between the predicted location of impact and another predicted location of impact of another electrode. A predicted location of impact may be determined to not correspond to a suitable location if the predicted location corresponds to an unsuitable body part or the predicted location is associated with a determined distance to a second predicted location of impact that is less than a threshold. A predicted location of impact may be determined to not correspond to a suitable location when the predicted location corresponds to a suitable body part, but is associated with a determined distance to a second predicted location of impact that is less than a threshold. A predicted location of impact may be determined to not correspond to a suitable location when the predicted location is associated with a determined distance to a second predicted location of impact greater than a threshold, but corresponds to an unsuitable body part. In other embodiments, a likely or predicted location of impact of an electrode may be determined to correspond or not correspond to a suitable location based on a determined distance between the predicted location of impact and another predicted location of impact of another electrode, independent of whether the predicted location corresponds with a suitable body part. In embodiments, a likely or predicted location of impact of an electrode may be determined to correspond or not correspond to a suitable location based on a determined distance between the predicted location of impact and another predicted location of impact of another electrode without a camera and/or CEW determining whether the predicted location corresponds with a suitable body part.

A notice may include an instruction to a CEW to launch the electrodes. In the case where the likely locations of impact correspond to unsuitable body parts, camera 110 may transmit a message (e.g., notice) regarding the unsuitability of the likely locations of impact. In embodiments, a predicted location of impact may be determined to be unsuitable (e.g., not correspond to a suitable location) based on a classification of a body part. A notice may include an instruction to a CEW to not launch the electrodes. A notice may include an instruction to a CEW to alter the trajectory of one or more electrodes prior to launch. Instructions to alter the trajectory of one or more electrodes include instructions to the user of the CEW regarding the orientation of the CEW. For example, an audible instruction may instruct the user to "aim lower" or to "turn [the CEW] sideways". Instructions to user 140 may be provided via user interface 230 and/or user interface 330. Instructions to user 140 may be audible, haptic, visual, or any other conventional method.

Instructions to alter the trajectory of one or more electrodes includes providing information to the CEW so the CEW may automatically, which means without user intervention, change the trajectory of one or more electrodes. Changes may include increasing or decreasing the angle (e.g., angle 640) between the electrodes. Changes may include changing the orientation of one electrode with respect to another electrode. For example, the lower electrode may be moved from 180 degrees clockwise of the top electrode to 90 degrees clockwise of the top electrode. Alternations in orientation may include any alteration between 0 and 360 degrees.

In embodiments, adjusting an electrode may include rotating a second electrode about an axis of a first electrode prior to launch of the first and second electrode. Such an adjustment may not adjust an angle between the first and second electrode. An angle of the first electrode relative to the CEW may be fixed. An angle between the first electrode and second electrode may not be adjustable. An angle between the first electrode and second electrode upon launch from the CEW may not be changed, independent of a rotational position of the second electrode about the first electrode. An angle of the first electrode relative to the CEW and/or target may remain unchanged during the adjustment of the second electrode. An angle of the first electrode may correspond to a longitudinal axis of the CEW. Such an adjustment may be instructed by a camera when a first predicted location of impact of a first location corresponds to a suitable body part, but a second predicted location of impact does not correspond to a suitable location and/or suitable body part. Such an adjustment may provide a particular benefit in orienting both first electrode and a second electrode toward a target, wherein the first electrode may be oriented toward a larger, less mobile body part of a target, while the second electrode is oriented toward a smaller, more mobile body part. For example, a larger body part may include a lower torso of a target, while a smaller body part may include a leg of the target.

In embodiments, only a second electrode of a CEW may be adjustably positioned. An instruction from a camera may include an instruction to only adjust a second electrode. A first electrode may be stationary and/or not adjustable relative to a handle of the CEW. Certain of these embodiments may include embodiments in which a relative angle between electrodes is not adjustable and/or the second electrode is rotationally adjustable about the first electrode. Such adjustments may enable a first electrode to remain predictably oriented at the location on a target associated with a first laser spot. This arrangement may provide particular benefit in embodiments in which a first laser spot is a single, only laser spot projected by the CEW. Such predictability may decrease an apparent need to manually readjust an orientation of a CEW by a user, including relative to other embodiments in which both electrodes are adjustable. By limiting adjustments to only a second electrode, embodiments according to various aspects of the present invention may decrease a complexity of a CEW and/or deployment unit configured to orient and aim both a first electrode and the second electrode.

Camera 110 may also determine the distance (e.g. difference) between one or more likely locations of impact and may provide instructions for the CEW to adjust the trajectory of one or more electrodes to increase the distance between the electrodes. In embodiments, instructions from the camera may only adjust a second electrode of a pair of electrodes.

Camera 110 may use knowledge of the anatomy of the target to increase the distance through target tissue as opposed to the distance between electrodes. For example, presume that the spread between two electrodes on the target is estimated to be about 4 inches along the side of the torso of the target. Camera 110 may determine that the trajectory of one electrode may be altered slightly to launch one electrode in the side of the target and another in the arm of the target. The straight-line distance between the electrodes may still be 4 inches, but the amount of target tissue between the electrodes is much greater.

Instructions may include changing the trajectory of one or more electrodes so that the location of impact for the electrodes includes suitable body parts as opposed to unsuitable body parts.

In an implementation, a user of a CEW 120 sweeps (e.g., moves) the laser spot over (e.g., across, back-and-forth) the anatomy of the target. Camera 110 detects and/or calculates the likely locations of impact of electrodes 112 and 114. When the likely locations of impact of electrodes 112 and 114 correspond to suitable body parts, camera 110 provides a notice to CEW 120 that instructs CEW 120 to launch electrodes 112 and 114. Camera 110 may predict when the movements of the target and the movements of CEW 110, based on past patterns of movement, will provide an opportunity to launch electrodes.

A deployment unit may include bores that house the electrodes. The trajectory of an electrode may be changed (e.g., altered, adjusted) by moving the bore. An orientation of a bore may be adjusted so that the opening of the bore through which the electrode exits locations in a different direction so as to alter the trajectory of the bore. For example, the angle of one bore relative to another bore may be altered. The orientation of one bore may be changed relative to the other bore. For example, the lower bore may originally be oriented to 180 degrees below (e.g., south) of the top bore. The orientation of the lower bore may be moved around the axis of the upper bore to position the lower bore at a different orientation. For example, the orientation may be moved (e.g., rotated) from 180 degrees to 90 degrees, or 270 degrees, or any orientation between 0 and 360 degrees. The second bore and/or second electrode may be rotated about a longitudinal axis of the CEW. Other intermediate directions of orientation may be instructed and/or applied as well. For example, a second location is determined to be positioned at 195 degrees about a longitudinal axis of CEW, indicia of this direction of orientation may be provided in an instruction to a CEW. In embodiments, a second bore or lower bore may be rotated about the first bore. Orientation of the first or upper bore, including a position of the first bore relative to handle 380, may not be changed during rotation of a second bore.

In an implementation, deployment unit 390 includes propulsion unit 410, adjustment circuit 420, bores 430 and 440, electrodes 432 and 442, and adjustment mechanisms 436 and 446. Adjustment mechanisms 436 and 446 may cooperate with adjustment circuit 420 to alter the trajectory and/or position of bores 430 and 440. Adjustment mechanisms 436 and 446 may tilt, rotate, and/or move bores 430 and 440 respectively to adjust the trajectory of electrodes 432 and 442 respectively. Handle 380 of CEW 120 may receive messages from camera 110 regarding initiating deployment unit 390 to launch electrodes 432 and 442 and/or adjusting the trajectory and/or position of bores 430 and 440. Handle 380 may provide information to adjustment circuit 420 responsive to a message to adjust the trajectory of one or more electrodes. Adjustment circuit 420, responsive to the message, may cooperate with adjustment mechanisms 436 and 446 to accomplish the adjustment. Handle 380 may activate signal 354 to activate propulsion unit 410 to launch electrodes 432 and 442 along their respective trajectories. Propulsion unit 410 may be activated responsive to a message from camera 110. A stimulus signal may be provided to electrodes 432 and 442 from stimulus signal generator 360 via signals 350 and 352 via interface 370. In embodiments, a deployment unit 390 may include adjustment mechanism 446, but not adjustment mechanism 436.

In other embodiments, an adjustment mechanism may be incorporated in interface 370, enabling an entire deployment unit to be adjusted (e.g., rotated), rather than bores of the deployment unit being adjusted independently. In such embodiments, an adjustment circuit may be provided in a handle of a CEW, such as handle 380, rather than a deployment unit. Such an arrangement may decrease complexity of a deployment unit, while yet allowing the deployment unit to be adjustable and/or oriented in one or more adjustable directions.

As discussed above, a camera may cooperate with a CEW to perform operations of the CEW such as enabling launch of electrodes, adjusting the trajectory of one or more electrodes, detecting the distance between electrodes on the target, and determining a distance from the CEW to a target.

Camera 110 and CEW 120 may cooperate to perform method 900. A processing circuit of camera 110 and/or CEW 120 may perform one or more steps of method 900. The steps of method 900 may be performed serially or in parallel. Results from performing a step of method 900 may be communicated between camera 110 and/or CEW 120. Information communicated between camera 110 and/or CEW 120 may be used as an input to a step of method 900.

Method 900 includes start 910, detect 912, identify parts 914, classify 916, locations suitable 918, inhibit 920, instruct 922, launched 924, end 926, adjustment feasible 928, and adjust 930.

Performance of method 900 begins at start 910. Execution moves to detect 912.

Detect 912 detects one or more likely locations of impact on a target of one or more electrodes. Any method for detecting the likely locations of impact, including the methods discussed above, may be used. Execution moves to identify parts 914.

Figure 8:
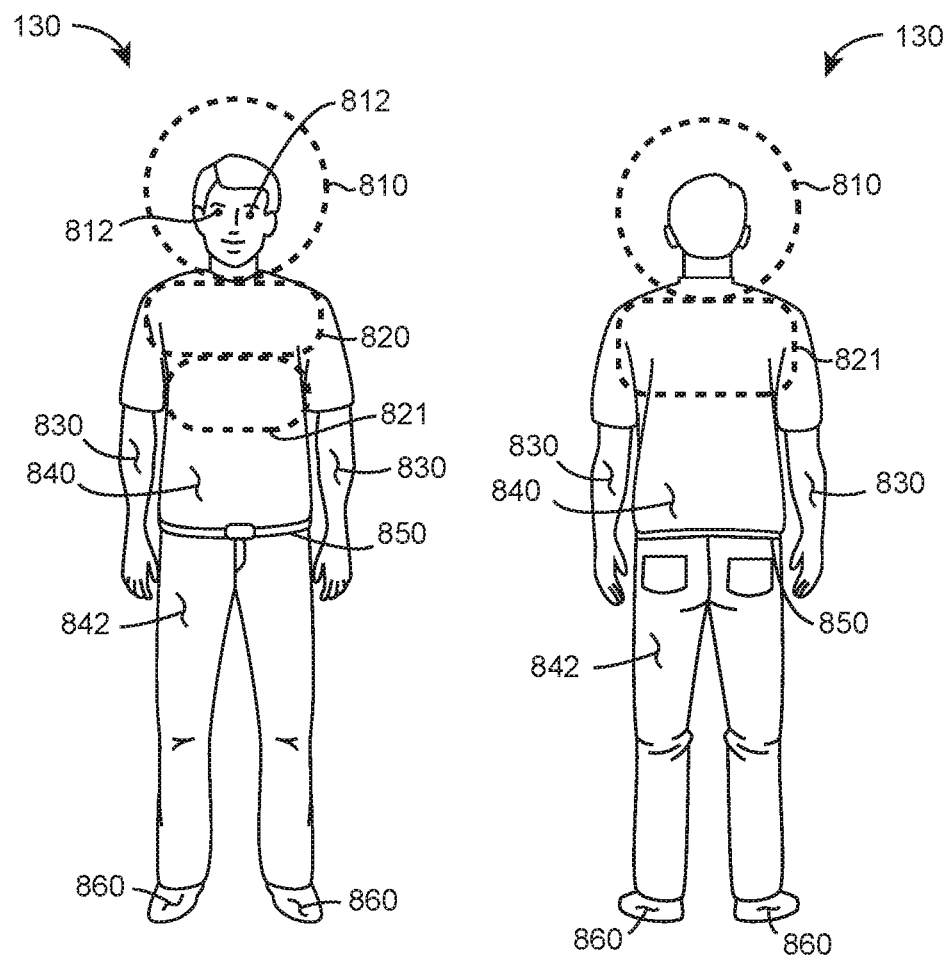
FIG. 8 is a diagram of the anatomy of a human target.
Figure 9:
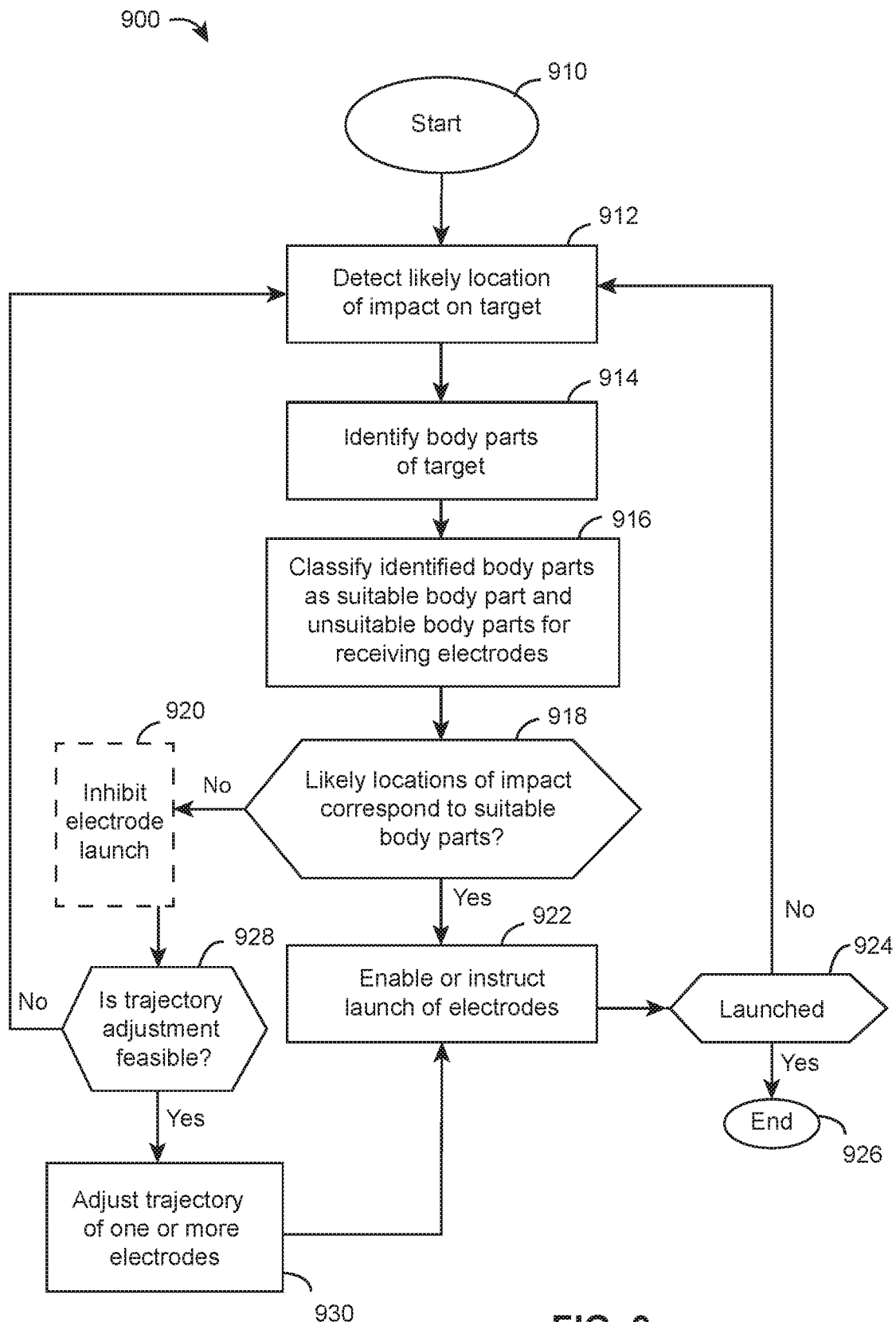
FIG. 9 is a diagram of a method for cooperation between a CEW and a camera.

Identify parts 914 identifies the body parts of a target. Camera 110 and/or CEW 120 may identify the parts of the anatomy of the target. Identify parts 914 notes the parts of the body of the target that are the likely locations of impact of the one or more electrodes. Identifying all possible parts of the body of the target, rather than just the body parts that are the likely locations of impact, may provide information for adjusting a trajectory of an electrode away from an unsuitable body part to a suitable body part because the suitable body part has been identified and has been determined to be accessible. Body parts of a human target are shown in FIG. 8 and discussed in the related portions of the specification. Execution moves to classify 916.

Classify 916 classifies the identified body parts of the target as at least one of suitable and unsuitable locations for receiving electrodes and/or providing a stimulus signal. As discussed above, in order to avoid unnecessary harm to target 130, eye 812 may be classified as unsuitable. The classification of body parts may be stored in a memory of camera 110 and/or CEW 120. Classify 916 may correlate identified body parts to their appropriate classification. Body parts that are likely locations for impact of an electrode may also be classified. Unsuitable locations for impact may also include body parts which do not enable a good electrode attachment. For example, rib area 821 may be classified as unsuitable. Suitable body parts may include any body parts that enable good electrode attachment and delivery of a stimulus signal. After classification, execution moves to locations suitable 918.

Locations suitable 918 determines whether the body parts of the target that are the likely locations for impact of the one or more electrodes are suitable for receiving an electrode and/or delivering a stimulus signal. Camera 110 and/or CEW 120 may compare the locations of the one or more likely locations of impact for the electrodes to the suitable body parts of the target. Camera 110 and/or CEW 120 may alternately or additionally compare a determined distance between the locations to a threshold. If the likely locations of impact correspond to a suitable body part and/or a determined distance is greater than the threshold, execution moves to instruct 922. If the one or more likely locations of impact correspond to an unsuitable body part and/or a determined distance does not exceed a threshold, execution moves to inhibit 920.

Instruct 922 enables or instructs the launch of one or more electrodes from CEW 120 towards the target. In an implementation, instruct 922 may merely not impede a user of CEW 120 from activating the CEW to launch the electrodes. In another implementation, instruct 922 may audibly instruct the user via user interface 230/330 to launch (e.g., pull a trigger) the one or more electrodes. In another implementation, instruct 922 may instruct CEW 120 to launch the one or more electrodes without user intervention (e.g. automatically) as discussed above. Execution moves to launched 924.

Launched 924 determines whether the one or more electrodes were launched from CEW 120. If electrodes are not launched, execution returns to detect 912. In the case where electrodes were launched, execution moves to end 926.

Inhibit 920 inhibits the launch of one or more electrodes by CEW 120. Inhibit 920 may be optional. In dangerous situations, a police officer may not want his or her CEW to be disabled. An officer may assess the situation and determine the risk of use of the CEW. Use of a CEW may be the best option for resolving a situation even if the electrodes and/or stimulus signals are not delivered to locations on the target that are deemed suitable locations. The inhibition of the launch of one or more electrodes may be accomplished by disabling the trigger or by disabling activation of the propulsion unit of a cartridge. Execution moves to adjustment feasible 928.

Adjustment feasible 928 determines whether changing (e.g., adjusting) the trajectory of one or more electrodes of CEW 120 is possible. When camera 110 or CEW 120 determines that a likely location of impact of an electrode is unsuitable, camera 110 or CEW 120 may identify one or more suitable locations of impact. Identifying a suitable location of impact may include information as to a distance or a vector from the current likely location of impact to the locations of impact. Adjustment feasible 928 determines whether an adjustment from the present likely location of impact is within the range of adjustment of the CEW. If the amount of adjustment is within the range of the hardware used to change the trajectory of an electrode, adjustment feasible 928 determines that the adjustment is feasible and execution moves to adjust 932. If adjustment of trajectory is not feasible, execution returns to detect 912.

Adjust 930 makes adjustments to the trajectories of one or more electrodes. Adjustments to a trajectory may be accomplished as discussed above with respect to adjustment circuit 420 and adjustment mechanisms 426 and 446. For example, adjustment mechanisms 436 and 446 of a deployment unit 390 may adjust bores 430 and 440 that hold electrodes 112 and 114 respectively such that the trajectory of electrodes 112 and 114 are altered prior to launch. In an implementation, CEW 120 adjusts trajectories automatically without user intervention. In another implementation, making an adjustment includes instructing a user via a user interface 230/330 to move CEW 120 to adjust the aim of CEW 120. After adjustment, execution moves to instruct 922.

As discussed above, a camera and a CEW may cooperate to launch one or more electrodes without user intervention (e.g., automatically). Automated launch of one or more electrodes may be desirable in time-sensitive situations where human response times may be comparatively slow. In embodiments, an input may be received from a user interface of a CEW to permit launch, while subsequent processing by a combination of the camera and CEW may determine a timing at which electrodes are launched, absent a second input from the user interface. In such embodiments, a non-zero period of time may exist between a time at which a user input to launch the electrodes is received and a time at which the electrodes are launched from the CEW after the camera and/or CEW may have automatically performed steps further discussed herein. Additionally, camera 110 may detect visual information outside of the range that is detectable by the human eye. For example, camera 110 may capture information regarding scene using infrared technology which can detect objects that a human cannot see. In such a situation, automated launch of one or more electrodes using the captured data from camera 110 may improve performance of CEW 120 as well as protect the safety of officer 140 and target 130.

As noted above, a camera and a CEW may be separate devices in embodiments according to various aspects of the present invention. Such an arrangement may provide certain advantages to a system that includes such devices. For example, a camera may capture image data before a CEW is used. The camera may begin detecting objects in the captured image data independent of operation of CEW. In embodiments, a camera may detect objects including a target object prior to use of a CEW. For example, a camera may classify an object as a human or animal object before a laser sight of a CEW is activated, before a CEW is oriented toward an object, or even before a CEW is removed from a holster. A camera may further classify portions of an object prior to one or more such states of a CEW. An object may be detected and data corresponding to the detected object may be available for comparison with predicted locations of impact upon orientation of a CEW toward the object. Data generated and available for a detected object may include a classification of the object. Data generated and available for a detected object may include a classification of body parts of the object. Such an arrangement may improve a rate or speed at which a camera may detect a likely location of impact on a target and perform subsequent processing. Such an arrangement may decrease a time necessary for the system to determine one or more suitable locations for impact and launch or enable launch of electrodes. Such an arrangement may decrease a time necessary for the system to determine that a predicted location of impact does not correspond to a suitable location. Similar such advantages may not be available for other systems, including those in which a camera is physically integrated with a CEW and/or image data of an object is not otherwise captured until the CEW is oriented toward a target.

Method 1000 is an implementation of a method for launching electrodes from a CEW that automatically activates launch of the electrodes. The electrodes may be launched independent of an input or any input received via a user interface of the CEW. Camera 110 and CEW 120 may cooperate to perform method 1000.

Method 1000 includes start 1010, sweep 1020, method 900, and end 1030.

Execution begins at start 1010. Execution moves to sweep 1020.

Sweep 1020 determines whether CEW 120 is being swept so that the trajectories of one or more electrodes move across, possibly more than one time (e.g., back and forth), a target. Camera 110 may detect a potential target and may further determine if the likely locations of impact are moving across or back and forth over the target. An officer may sweep a target to indicate that the officer wants camera 110 and CEW 120 to automatically launch electrodes when they strike suitable locations on the target.

Camera 110 may detect a sweep based on one or more factors. The factors may include a number of crossings of a laser spot across a target, a pattern of movement based on a direction of orientation received from a CEW, a status of a safety of CEW, and combinations of these factors.

For example, camera 110 may detect a number of times in which a same laser spot crosses a target. A laser spot may cross a target along a same path or a substantially same path. A path may be in a horizontal direction. Each crossing may begin or terminate beyond an edge of the target captured in image data by the camera. A sweep may be detected by the camera after the laser spot crosses a target a threshold number of times. For example, a sweep may be detected after a crossing is detected at least six times. Other threshold numbers may be employed as well, including higher numbers such as 8, 10, or 12 crossings, which may increase accuracy of a sweep being detected. The number of times may be sequential, uninterrupted by detected travel of the laser spot along a different path. If travel along the target outside a same path is detected, a sweep may not be detected. The number of times may also be detected within a predetermined time period, including less than ten seconds, less than five seconds, or less than three seconds. If the number of crossings is not detected with the time period, a sweep may not be detected. Detecting a number of crossings may prevent incidental movement of the CEW from resulting in a detected sweep and subsequent enabling of launch of electrodes toward the target.

Detecting a sweep may also include detecting a pattern in a direction of orientation of the CEW. A direction of orientation of the CEW may be detected by the CEW and transmitted to the camera by the CEW. A sequential set of directions of orientation of the CEW may form a pattern. For example, a pattern may include sequential movement of the CEW in opposite directions. A direction of orientation of the CEW may include an angle of rotation of the CEW about a vertical axis of the CEW. The pattern may involve a minimum number of sequential opposite movements, including three or more sequential pairs of movements, four or more sequential pairs of movements, five or more sequential pairs of movements, or greater than five pairs of sequential movements. Detecting the sweep based on a pattern of movements may preclude unintentional launch of electrodes when a position of laser spots may change based on movement of a target, rather than controlled, intentional movements of a CEW.

Detecting a sweep may also include determining whether a safety of the CEW is disengaged. If a safety is disengaged, a sweep may be detected. A status of the safety may be transmitted by the CEW to the camera. Detecting a sweep based on a status of the safety may also prevent unintentional launch of the electrodes and/or confirm, indicate, or otherwise enable launch of the electrodes upon detection of a sweep. Combinations of one or more of these factors, including each of these three factors, may be included in detecting a sweep of a CEW by a camera.

Once camera 110 and/or CEW 120 detect the sweeping of a target, camera 110 and/or CEW 120 execute method 900 until suitable locations are identified then electrodes are launched via step 922. Method 900 is discussed above. After launch of the electrodes by step 922, execution returns to sweep 1020.

Figure 11:
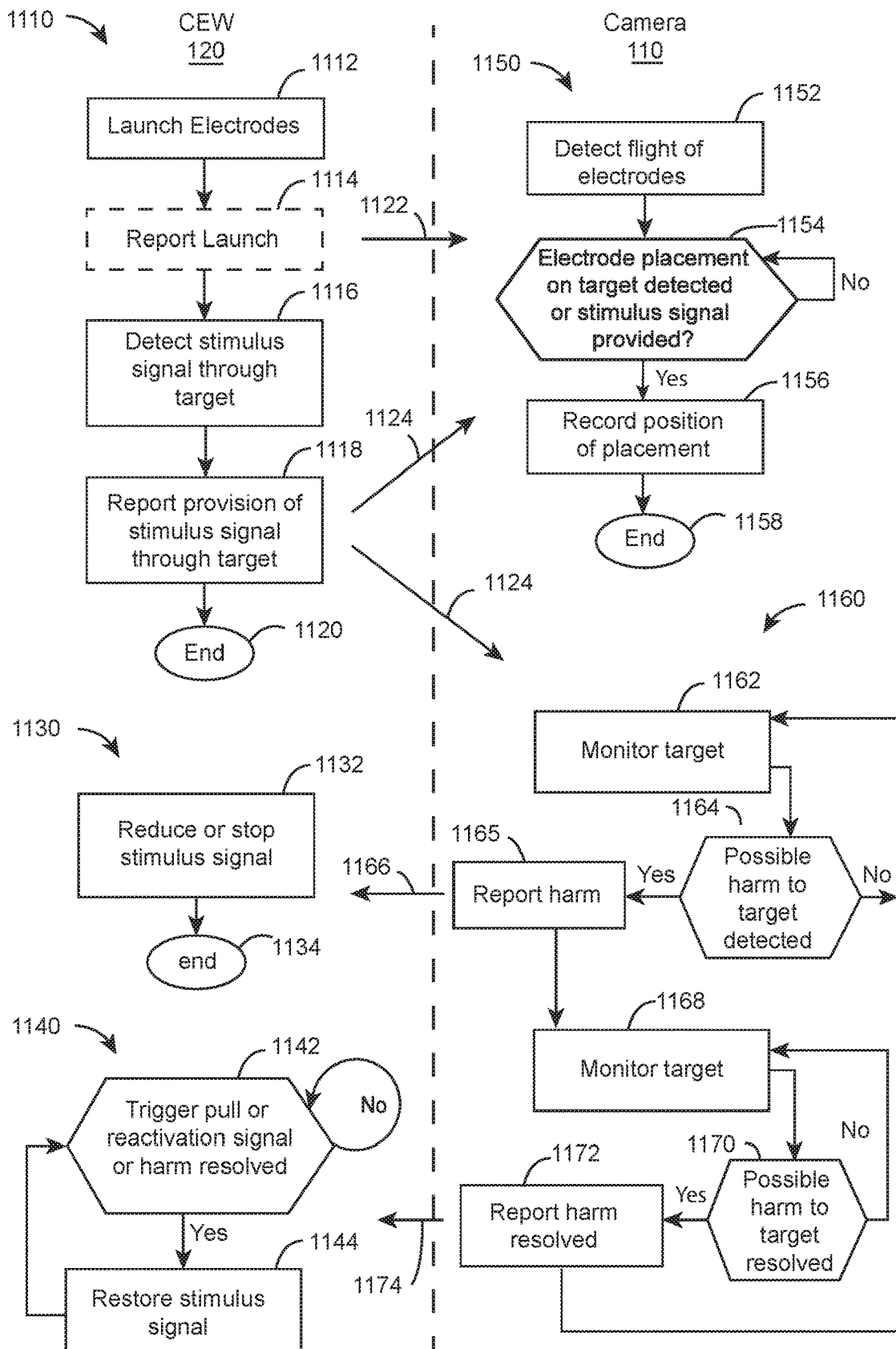
FIG. 11 is a diagram of methods performed by and communication between a CEW and a camera during an incident.
Figure 12:
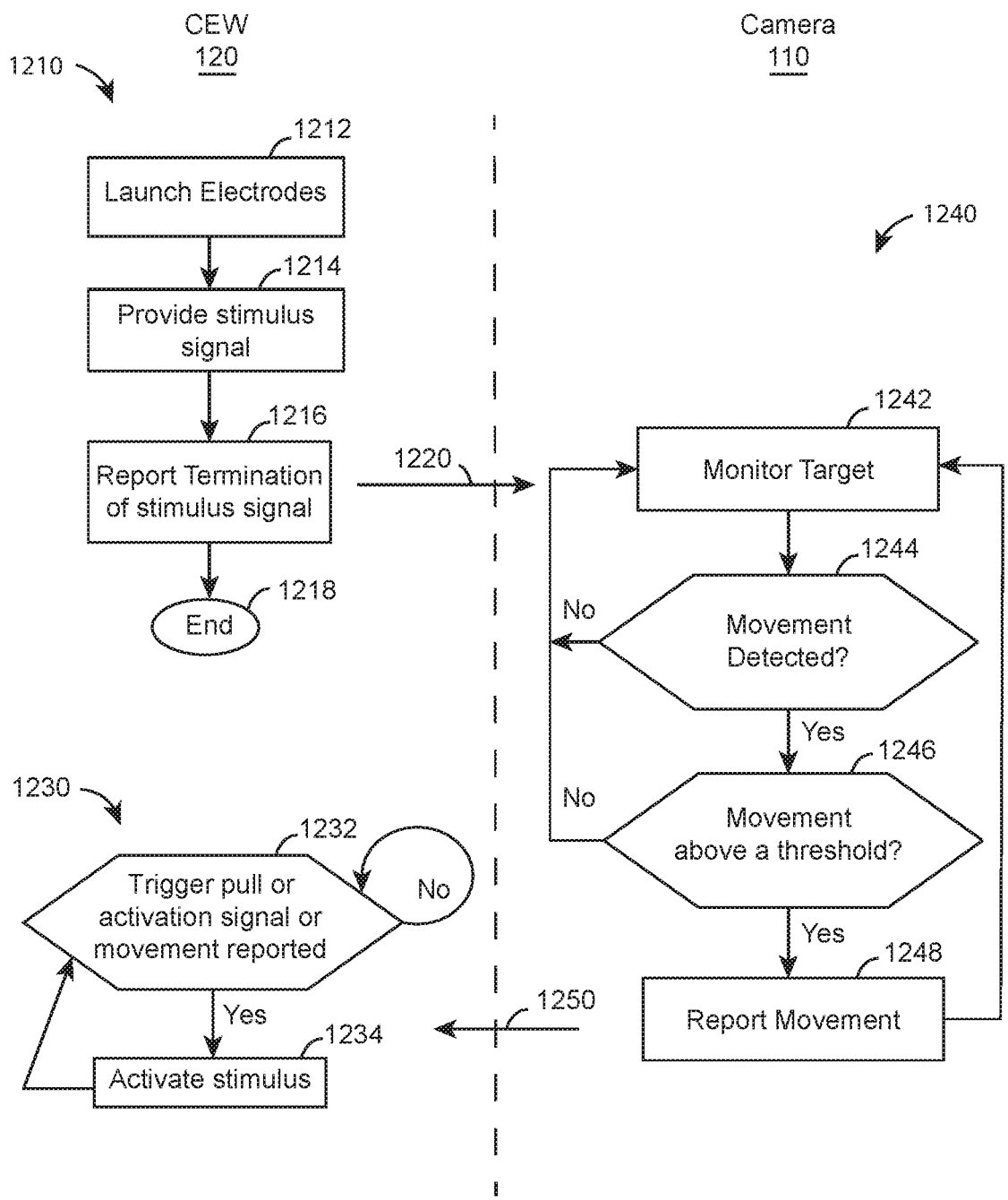
FIG. 12 is a diagram of methods performed by and communication between a CEW and a camera while monitoring a target.

Camera 110 and CEW 120 may cooperate protect the safety of a target and/or a user. Cooperation between camera 110 and CEW 120 may be accomplished by performing certain methods on camera 110 or CEW 120 and communicating a result between camera 110 and CEW 120. The diagrams shown in FIGS. 11 and 12 show methods performed by CEW 120 (e.g., method 1110, method 1130, method 1140, method 1210, method 1230) and methods performed by camera 110 (e.g., method 1150, method 1160, method 1240) and communication between CEW 120 and camera 110. The methods and communication shown in FIGS. 11 and 12 enable CEW 120 and camera 110 to cooperate to perform a function, such as protecting the officer and/or target.

The steps of methods 1110, 1130, 1140, 1150, 1160, 1210, 1230, and 1240 may be executed in any order. Methods 1110, 1130, 1140, 1150, 1160, 1210, 1230, and 1240 may be executed at the same time (e.g., in parallel). Steps of methods 1110, 1130, 1140, 1150, 1160, 1210, 1230, and 1240 may be executed at the same time (e.g., in parallel). Method 1110, 1130, 1140, 1150, 1160, 1210, 1230, and 1240 may receive information (e.g., an input, message) and perform an operation responsive to the information. Method 1110, 1130, 1140, 1150, 1160, 1210, 1230, and 1240 may generate and/or transmit information (e.g., message). A method may be started, terminated, or restarted at any time and in any order.

Methods 1110 and 1150 provide a visual record of the delivery of a stimulus signal to a target. CEW 120 and camera 110 cooperate to create the record. CEW 120 performs method 1110. Camera 110 performs method 1150. CEW 120 transmits messages 1122 and 1124 to provide information regarding operation of CEW 120. Camera 110 receives messages 1122 and 1124. Camera 110 may use information from messages 1122 and 1124 to control execution of method 1150.

Method 1110 includes launch 1112, report 1114, detect stimulus 1116, report 1118, and end 1120. Report 1114 may be omitted. Omission of report 1114 eliminates message 1122. Method 1110 is executed by CEW 120. Method 1110 may be executed concurrently with method 1150 and/or method 1160.

Execution of method 1110 begins at launch 1112.

Launch 1112 launches one or more electrodes from CEW 120 toward a target. The launch of electrodes may be initiated manually by a user or automatically as discussed above. Execution moves to report 1114.

Report 1114 transmits message 1122. Message 1122 may include indicia that CEW 120 has launched one or more electrodes. Message 1122 may provide information to method 1150. Execution moves to detect stimulus 1116.

An electrode that launches from CEW 120 may strike target 130 but may fail to deliver a stimulus signal through target 130. For example, an electrode may fail to deliver a stimulus signal to a target if the electrode is positioned more than an inch away from target of if clothing interferes with the electrode. However, circuitry in a CEW may detect whether a current is delivered and may assess the likelihood that it was delivered through the target. Detect stimulus 1116 detects the delivery of stimulus signal through the target. Execution moves to report 1118.

A camera may also cooperate with a CEW to detect whether a stimulus signal is delivered through a target by detecting movement of the target that indicates the stimulus signal is flowing through target tissue. A camera may report detecting a current through a target to a CEW to help the CEW to determine or confirm that the stimulus signal has been delivered through the target. A CEW may receive confirmation from a camera of delivery of the stimulus signal. A CEW may record in a log receipt of confirmation of delivery.

Report 1118 transmits message 1124. Message 1124 may include indicia that the stimulus signal has been delivered to the target. Message 1124 may provide information to method 1150 and/or method 1160. Execution moves to end 1120.

Method 1150 includes detect 1152, placement 1154, record 1156, and end 1158.

Execution of method 1150 begins at detect 1152. Detect 1152 uses the visual and computation capabilities of the camera to detect the flight of electrodes from CEW 120. The execution of detect 1152 may start upon detecting electrodes in flight or in response to receiving message 1122 that reports the launch of electrodes. Camera 110 may record the flight of the electrodes. Execution moves to placement 1154.

Placement 1154 detects either the placement of one or more electrodes on target 130 or a notice that a stimulus signal has been delivered to target 130. If placement 1154 detects electrodes on a target, execution may move to record 1156. If placement 1154 receives notice that a stimulus signal has been provided through target 130, for example by receiving message 1124, execution may move to record 1156 even if camera 110 cannot detect the electrodes on the target. Placement 1154 may detect movements in target 130 that are indicative of a stimulus signal going through target 130 and in response execution may move to record 1156. In embodiments, detecting placement 1154 may involve one or more of detection by a camera of placement of electrodes on a target based on image data captured by the camera, receiving notice from a CEW that a stimulus signal has been provided through the target, and detection of movement of the target by the camera based on image data captured by the camera indicative of the stimulus signal being applied to the target. In embodiments, multiple (two or more, three or more) such bases of placement may be required prior to moving to record 1156.

In embodiments, camera 110 may make a record (e.g., metadata) regarding a basis of placement 1154. Each record may be saved in metadata associated with audiovisual information captured by a camera and/or a log stored on the camera. Each record may indicate a basis on which execution of the camera may move to record 1156. Camera 110 may be configured to make a separate record for each basis, including multiple records for multiple same or different bases that are detected or received. For example, a set of metadata or a log may indicate that the electrodes may have been placed on a target, but no notice regarding the stimulus signal was received from a CEW. The log may also indicate an event where placement was detected visually and notice that a stimulus signal was received, yet no movement associated with a provided stimulus signal was detected by the camera. Such records may provide, supplement, and/or confirm activity during an event or incident as part of a subsequent review of the event or incident.

In the event that camera 110 does not detect electrodes on target 130, receive a notice of delivery of a stimulus signal through target 130, or detect movements of target 130 that are indicative of a stimulus signal being delivered through target 130, execution may move to record 1156 after elapse of a period of time (e.g., time-out).

Record 1156 makes an audiovisual record of target 130. If the electrodes on target 130 are visible, the record includes the placement of the electrodes on target 130. For example, a record may indicate a body part to which each of the electrodes have been placed on the target. An audiovisual record may indicate a first body part for a first electrode and a second body part for a second electrode. The record may be generated by the camera immediately after a detected placement by the camera. For example, the record may be generated prior to conclusion of the stimulus signal by the CEW. In other embodiments, the audiovisual record may be generated prior to offload of image or video data associated with the event from the camera. If the electrodes are not visible on target 130, camera 110 may record that it received a notice (e.g., notice 1124) of delivery of a stimulus signal through the target and record audiovisual information about target 130 after receiving the notice. If camera 110 detects movements of the target that indicate delivery of a stimulus signal through the target, camera 110 may continue to record target 130 during and after detecting the symptomatic movements. After a record of the target is made, execution moves to end 1158.

Record 1156 may instruct a user of camera 110 to move closer to target 130 or around all sides of target 130 to make a more complete or detailed record of target 130 at a time when a stimulus signal likely has been delivered through target 130.

Methods 1110 and 1150 cooperate to create a record of a time during which a stimulus signal may have been delivered through a target. Delivery of a stimulus signal through a target is considered by many police departments as a use of force. Methods 1110 and 1150 cooperate to create a record of a use of force that may be used as evidence.

CEW 120 and camera 110 may record information in a log or as metadata that further documents the delivery of the stimulus signal. For example, CEW 120 may create a record of launching electrodes, transmitting message 1122, detecting delivery of the stimulus signal, and transmission of message 1124. Camera 110 make create and store metadata associated with the captured audiovisual information regarding detecting the flight of electrodes, detecting electrodes on target 130, receiving message 1124, and detecting movements in target 130 that indicate delivery of a stimulus signal. The data logged by CEW 120 and the metadata created by camera 110 serves to provide more evidence regarding the incident.

Methods 1130, 1140, and 1160 cooperate to protect both the target and the officer from potential harm. CEW 120 and camera 110 cooperate to protect target 130 and officer 140. CEW 120 performs methods 1130 and 1140. Camera 110 performs method 1160. Camera 110 transmits messages 1166 and 1174 to provide information detected by camera 110. CEW receives messages 1166 and 1174. CEW 120 may use information from messages 1166 and 1174 to perform methods 1130 and 1140.

Method 1160 includes monitor 1162, determine 1164, report 1165, monitor 1168, resolve 1170, and report 1172.

Execution of method 1160 begins at monitor 1162. Monitor 1162 visually monitors a target. Monitor 1162 visually monitors a target for indicia of potential harm and/or injury to the target. Monitor 1162 may monitor the movements of target 130 to detect movements of target 130. Monitor 1162 may detect movements of the target and assess whether the movements of target 130 are signs that potential harm may occur to target 130. Monitor 1162 may detect acceleration of the target toward a second objected detected by the camera in captured image or video data. Monitor 1162 may detect an abrupt change in direction of the target, including a change in direction of the target toward a second object. Monitor 1162 may detect a movement of target 130 in a downward direction. The second object may be a solid object, such as a floor or ground at a location of the target or a wall adjacent the target. The second object may include a chair, table, desk, pole, or other object detected by the camera 110. For example, monitor 1162 may detect when target 130 is falling. A target that is falling, especially when affected by NMI during delivery of a stimulus signal, may fall completely to the ground. Falling may increase the risk of harm to target 130. Execution moves to determine 1164.

Execution of determine 1164 determines whether camera 110 detected a situation that might result in potential harm to the target. For example, determination 1164 may include detecting an acceleration of the target 130 above a certain threshold. The detected acceleration may be above a predetermined threshold and toward a second object and/or in a downward direction. If potential harm has been detected, execution moves to report 1165. If no potential harm has been detected, execution returns to monitor 1162.

Monitor 1162 and determine 1164 cooperate with each other to monitor a target and to determine whether monitoring has detected a potential harm that may befall the target. In an implementation, monitor 1162 and determine 1164 detect when a target is falling.

Report 1165 transmits message 1166. Message 1166 may include indicia regarding the potential harm and/or injury that may occur to target 130. Message 1166 may include information regarding the type of harm that might befall target 130. Message 1166 may include information regarding the behavior or movement by target 130 that was detected by camera 110. Message 1166 may provide information to method 1130. Report 1165 may also include making a record in metadata or a log on the camera 110 corresponding to the type of harm, behavior or movement and/or the content of the message 1166 transmitted to the CEW. Execution moves to monitor 1168.

Monitor 1168 visually monitors a target. Monitor 1162 visually monitors a target for indicia of that the previously detected potential harm to target 130 has been resolved or terminated. Monitor 1168 may include capturing and processing additional video or image data by camera 110 after reporting 1165. Execution moves to resolve 1170.

Resolve 1170 determines whether the potential harm to the target previously detected has been resolved. For example, if monitor 1162 and determine 1164 detected that target 130 is falling, then potential harm to target 130 would be resolved or terminated if target completes the fall, stops falling or stands up. Resolve 1170 may determine that an acceleration of the target is one or more of below a predetermined threshold, away from a second object, and/or not in a predetermined direction. Resolve 1170 may determine that the target has ceased or been prevented from falling. If the potential harm appears to have been resolved or terminated, execution moves to report 1172. If the potential harm does not appear to be resolved or terminated, execution returns to monitor 1168.

Monitor 1168 and resolve 1170 cooperate with each other to monitor a target and to determine whether monitoring has detected the resolution or termination of a previously detected potential harm that might befall the target. In an implementation, monitor 1162 and determine 1164 detect when a target has ceased falling.

Report 1172 transmits message 1174. Message 1174 may include indicia that potential harm and/or injury to the target has been resolved. Message 1174 may include information regarding the type of harm that has been resolved or terminated. Message 1174 may include information regarding the behavior or movement by target 130 that was detected by camera 110. Report 1172 may also include making a record in metadata or a log on the camera 110 corresponding to the type of harm, behavior or movement and/or the content of the message 1174 transmitted to the CEW. Message 1174 may provide information to method 1140. Execution moves to monitor 1162.

Method 1130 includes reduce 1132 and end 1134.

Method 1130 begins execution in response to receiving message 1166. Execution begins with reduce 1132. Reduce 1132 reduces some aspect of the stimulus signal that is being delivered to target 130. Absent receipt of message 1166, CEW 120 may be configured to continue delivery of the stimulus signal and/or otherwise not reduce an aspect of the stimulus signal being delivered to target 130. The purpose of reducing some aspect of the stimulus signal is to reduce or terminate pain felt by target 130 or reduce or terminate the strength or effects of NMI experienced by target 130.

As discussed above, message reports that a potential harm might befall target 130. If a CEW is in the process of delivering a stimulus signal when message 1166 arrives, the potential for harm to befall target 130 may be reduced by reducing the effects of the stimulus signal on target 130. For example, if the potential harm is caused by the target falling, reducing some aspect of the stimulus signal may decrease the pain or NMI in the target thereby giving the target the ability to catch themselves in their fall. Reduce 1132 may use the information to determine whether or not to reduce some aspect of the stimulus signal. If the potential harm is not related to delivery of a stimulus signal, reduce 1132 may take no action to reduce an aspect of the stimulus signal. If the potential harm is related to delivery of a stimulus signal or may be reduced or averted by reducing some aspect of the stimulus signal, then reduce 1132 may reduce one or more aspects of the stimulus signal. After reduced 1132 reduces some aspect of the stimulus signal, execution moves to end 1134.

If a CEW is not in the process if delivery a stimulus signal when message 1166 arrives, execution may move to end 1134.

Aspects of a stimulus signal that may be altered (e.g., reduced, increased, enhanced, deemphasized) include current per pulse, pulse width, pulse rate, magnitude of ionization voltage, magnitude of muscle voltage, and number of pulses delivered in a series of pulses.

Method 1140 includes determine 1142 and restore 1144.

Determine 1142 operates to detect whether a stimulus signal that has been altered should be restored to its original values. Determine 1142 detects a trigger pull, a reactivation signal, or whether a potential harm to a target has been resolved. Upon detecting a trigger pull, execution moves to restore 1144. Upon detecting a reactivation signal, execution moves to restore 1144. Upon receiving message 1174 that includes indicia that a previously reported potential harm to target 130 has been resolved, execution moves to restore 1144. In embodiments, a CEW may not be reactivated until a message 1174 is received, including when message 1166 has been previously received by the CEW. In embodiments, a CEW may be reactivated by a trigger pull or other input received via a user interface of the CEW, independent of whether message 1174 is received.

Execution of determine 1142 and restore 1144 occurs only if the stimulus signal has been altered in some one prior to execution.

Restore 1144 restores the aspects of the stimulus signal that were previously altered. Restoring the aspects of the stimulus signal to their original settings restores the ability of the stimulus signal to cause pain or NMI to levels that were previously provided and/or experienced by target 130. Execution returns to determine 1142.

Methods 1160 and 1130 cooperate to protect target 130 from experiences a potential harm. Reducing the effects of the stimulus signal, even for a short period of time, may protect target 130 from being injured by allowing target 130 control over voluntary movement. Methods 1160 and 1140 cooperate to protect the officer from a target being able to harm the officer. Once potential harm has been averted by allowing target 130 to have greater control over voluntary movement, target 130 may attempt to harm officer 140. Once a potential harm to target 130 has been resolved, the stimulus signal may be restored to its former settings to disable target 130 until officer 140 may properly restrain target 130.

Detecting that a target is falling and reducing the stimulus signal to provide the target some voluntary use of their limbs for a period of time or until the potential fall has been resolved or averted is referred to as soft fall or controlled fall.

Methods 1210, 1240, and 1230 provide a stimulus signal to a target to impede locomotion of the target, monitor motion of the target, and reactivate the stimulus signal in the event that the target does not stop moving. CEW 120 performs methods 1210 and 1230. Camera 110 performs method 1240. CEW 120 transmits message 1220 to provide information regarding the termination of providing a stimulus signal. Camera 110 transmits message 1250 regarding movement of the target. Camera 110 receives message 1220. Camera 110 may use the information from message 1220 to begin monitoring movement of the target. CEW 120 receives message 1250. CEW 120 may use the information from message 1250 to reapply a stimulus signal.

Method 1210 includes launch 1212, provide 1214, report 1216, and end 1218.

Execution of method 1210 begins at launch 1212. Launch 1212 launches one or more electrodes from CEW 120 toward target 130. The launch of electrodes may be initiated manually by a user or automatically as discussed above. Execution moves to provide 1214.

Provide 1214 delivers a stimulus signal from CEW 120 to target 130. The stimulus signal may be provided to target 130 for a period of time. After elapse of the period of time, CEW 120 may cease to provide the stimulus signal through target 130. Execution moves to report 1216.

Report 1216 transmits message 1220. Message 1220 may include information regarding the stimulus signal and termination of the stimulus signal. Camera 110 may receive message 1220. Camera 110 may make a record (e.g., metadata) regarding receipt of message 1220. Execution of method 1240 may occur responsive to receive of message 1220 by camera 110. Execution moves to end 1218.

Method 1240 includes monitor 1242, detect 1244, threshold 1246, and report 1248.

Execution of method 1240 begins at monitor 1242. Monitor 1242 visually monitors a target. Monitor 1242 may provide visual information captured during monitoring target 130 to detect 1244. Execution moves to detect 1244.

Detect 1244 detects movement of target 130. Detect 1244 may detect the speed of movement of target 130. Detect 1244 may detect the duration of movement of target 130. Detect 1244 may detect the range of movement of target 130. Detect 1244 may detect the direction of movement of target 130. Detect 1244 may detect whether movement of target 130 is toward or away from officer 140. If movement is detected, execution moves to threshold 1246. If movement is not detected, execution returns to monitor 1242.

Threshold 1246 determines whether movement detected by detect 1244 surpasses (e.g. exceeds) a threshold. A threshold may include a predetermined, non-zero threshold for a duration of movement, a range of movement, a speed of movement, and/or a direction of movement. In embodiments, the determination may include one or more of detecting a speed of movement greater than a predetermined, non-zero threshold; detecting a duration of movement greater than a non-zero period of time; detecting a range of movement greater than a predetermined, non-zero threshold; and/or detecting a direction of moment within a predetermined range of directions, wherein the range of directions includes a direction toward the camera. Movement within a threshold range of directions may be considered a potential threat to officer 140. Movement above a threshold may be considered as a potential threat to officer 140. If movement above a threshold is detected, execution moves to report 1248. If movement above a threshold is not detected, execution returns to monitor 1242.

Monitor 1242, detect 1244, and threshold 1246 may execute in parallel. Monitor 1242, detect 1244, and threshold 1246 may execute serially so that data from monitor 1242 flows to detect 124 and data from detect 1244 flows into threshold 1246 for continuous, pipelined processing.

Report 1248 transmits message 1250. Message 1250 may include information regarding movement of target 130. Message 1250 may provide information to method 1230. Execution returns to monitor 1242.

Method 1230 includes blocks determine 1232 and activate 1234.

Execution of method 1230 begins upon receipt of message 1250. Execution moves to determine 1232.

Determine 1142 operates to detect whether the CEW should be reactivated to provide a stimulus signal to target 130 again. Determine 1142 detects a trigger pull, a reactivation signal, or whether target 130 has moved. Upon detecting a trigger pull, execution moves to activate 1234. Upon detecting a reactivation signal, execution moves to activate 1234. Upon receiving message 1250 that includes information regarding movement of target 130, execution moves to restore 1144.

Activate 1234 reactivates (e.g., provides, activates again) delivery of a stimulus signal delivery to target 130. Once delivery of the stimulus signal restarts, execution moves to determine 1232. Termination of the reactivated stimulus signal may be accomplished by another method or step of a method. In another implementation, execution could move from activate 1234 to step 1214 of method 1210.

Further implementations of the disclosure include the following.

A system for improving safety of a human or animal target during delivery of a stimulus signal through the target, the stimulus signal for impeding locomotion of the target, the system comprising: a camera for capturing images of the target; a conducted electrical weapon ("CEW"), the CEW for launching one or more electrodes toward the target to provide the stimulus signal through the target; wherein: during delivery of the stimulus signal through the target, the camera classifies a movement of the target as at least one of safe and unsafe with respect to the target; the camera transmits a first message to the CEW; and responsive to the first message, the CEW alters a characteristic of the stimulus signal.

The above system wherein the CEW alters an amount of current provided by one or more pulses of the stimulus signal.

The above system wherein the CEW alters a pulse rate of the stimulus signal.

The above system wherein: while the camera classifies the movement of the target as safe, the camera provides a second message to the CEW; and responsive to the first message, the CEW increases an amount of current provided through the target.

A system for improving safety of a human or animal target during delivery of a stimulus signal through the target, the stimulus signal for impeding locomotion of the target, the system comprising: a camera for capturing images of the target; wherein: during delivery of the stimulus signal through the target by a conducted electrical weapon ("CEW"), the camera classifies a movement of the target as at least one of safe and unsafe with respect to the safety of the target; and responsive to classification of the movement as unsafe, the camera transmits a first message.

The above system wherein the first message contains a classification of a movement of the target as at least one of safe and unsafe with respect to the target.

The above system wherein the first message contains instructions to alter a characteristic of the stimulus signal.

A system for improving safety of a human or animal target during delivery of a stimulus signal through the target, the stimulus signal for impeding locomotion of the target, the system comprising: a conducted electrical weapon ("CEW"), the CEW for launching one or more electrodes toward the target to provide the stimulus signal through the target; wherein: during delivery of the stimulus signal through the target, the CEW receives a first message, the first message classifies a movement of the target in response to the stimulus signal as at least one of safe and unsafe with respect to the safety of the target; and responsive to a first message, the CEW alters a characteristic of the stimulus signal.

The above system wherein the first message contains a classification of a movement of the target as at least one of safe and unsafe with respect to the target.

The above system wherein the first message contains instructions to alter a characteristic of the stimulus signal.

A method performed by a camera for improving safety of a human or animal target during delivery of a stimulus signal through the target, the stimulus signal for impeding locomotion of the target, the method comprising: classifying a movement of the target, during delivery of a stimulus signal, as at least one of safe and unsafe with respect to the target; and responsive to classifying, transmitting a first message.

A method performed by a conducted electrical weapon ("CEW") for improving safety of a human or animal target during delivery of a stimulus signal through the target, the stimulus signal for impeding locomotion of the target, the method comprising: delivering a stimulus signal to the target; during delivery of the stimulus signal, receiving a first message, the first message classifies a movement of the target in response to the stimulus signal as at least one of safe and unsafe with respect to the safety of the target; and responsive to the first message, altering a characteristic of the stimulus signal.

A system for improving safety of a user of a conducted electrical weapon, the CEW for launching one or more electrodes toward a human or animal target, the electrodes for providing a stimulus signal through the target to impede locomotion of the target, the system comprising: a camera for capturing images of the target; the CEW; wherein: the CEW launches the one or more electrodes towards the target; the CEW provides the stimulus signal through the target via the one or more electrodes; the CEW ceases to provide the stimulus signal through the target; the camera detects a movement of the target after CEW has ceased providing the stimulus signal; the camera determines that the movement of the target is greater than a threshold; and the camera provides a first message that instructs the CEW to resume provision of the stimulus signal.

A system for detecting delivery of a stimulus signal through a human or animal target, the system comprising: a camera for capturing images of the target, the camera worn by a user; a conducted electrical weapon ("CEW"), the CEW includes a signal generator for generating the stimulus signal, a memory, and one or more wire-tethered electrodes, the one or more wire-tethered electrodes for launching toward the target to provide the stimulus signal through the target, the CEW carried by the user, the camera separate from the CEW; wherein: the CEW launches one or more wire-tethered electrodes toward a target; the signal generator provides the stimulus signal; the signal generator determines that the stimulus signal was delivered through the target; the camera detects a movement of the target that is consistent with delivery of the stimulus signal through the target; the camera transmits a message to the CEW that includes information regarding the detected movement of the target that is consistent with delivery of the stimulus signal through the target; the CEW stores in the memory indicia that the signal generator determined that the stimulus signal was delivered through the target; and the CEW records in the memory indicia regarding the detected movement of the target.

The above system wherein the camera stores the captured images of the detected movement of the target that are consistent with delivery of the stimulus signal through the target.

The above system wherein the camera creates and stores metadata regarding the detected movement of the target that are consistent with delivery of the stimulus signal through the target.

In embodiments according to various aspects of the presentation, a system may include a camera and a device configured to launch two or more projectiles. The two or more projectiles may include a first projectile and a second projectile. The projectiles may include electrodes or darts. The projectiles may include a body and at least one spear. The projectiles may be tethered, including tethered to another projectile and/or a handle of the device from which the projectiles may be launched. A camera may determine distances and/or predict locations of impact associated with the projectiles, including based on information transmitted and received between the camera and the other device.

While the preferred embodiment of the invention has been illustrated and described, it will be appreciated that various changes can be made therein without departing from the spirit and scope of the invention. Examples listed in parentheses may be used in the alternative or in any practical combination. As used in the specification and claims, the words 'comprising', 'comprises', 'including', 'includes', 'having', and 'has' introduce an open-ended statement of component structures and/or functions. In the specification and claims, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. In the claims, the term "provided" is used to definitively identify an object that not a claimed element of the invention but an object that performs the function of a workpiece that cooperates with the claimed invention.

The location indicators "herein", "hereunder", "above", "below", or other words that refer to a location, whether specific or general, shall be construed to refer to any location in the specification.

A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A method of delivering electrodes, the method comprising:
    capturing, by a camera system, image data of a target via an image sensor of the camera system;
    determining, by the camera system, whether a predicted first location of impact of a first electrode to be launched by a conducted electrical weapon and a predicted second location of impact of a second electrode to be launched by the conducted electrical weapon correspond to suitable locations on a body of the target;
    transmitting, by the camera system, a message via a communication circuit of the camera system to the conducted electrical weapon to enable launch of the first electrode and the second electrode when the predicted first location and the predicted second location correspond to the suitable locations;
    transmitting, by the camera system, an instruction to adjust a trajectory of the second electrode when the predicted second location is determined to not correspond to a suitable location on the body of the target; and
    launching, by the conducted electrical weapon, the first electrode and the second electrode in response to the message.

2. The method of claim 1, wherein transmitting the instruction comprises transmitting audible, haptic, or visual information via a user interface of the camera system.

3. The method of claim 1, further comprising:
    predicting, by the camera system, a first location of impact on the body of the target of the first electrode to generate the predicted first location; and
    predicting, by the camera system, a second location of impact on the body of the target of the second electrode to generate the predicted second location.

4. The method of claim 3, wherein predicting the first location of impact comprises detecting a position of a first laser spot on the body of the target in the image data.

5. The method of claim 4, further comprising projecting, by the conducted electrical weapon, only one laser spot from the conducted electrical weapon, wherein the only one laser spot comprises the first laser spot and each of the predicted first location and the predicted second location are determined through detection of the only one laser spot.

6. The method of claim 4, wherein predicting the second location of impact comprises detecting a position of a second laser spot on the body of the target in the image data.

7. The method of claim 3, wherein predicting the second location includes receiving, via the communication circuit of the camera system, indicia of at least one of a direction of orientation of the conducted electrical weapon, a distance between the conducted electrical weapon and the target, and an angle between the first electrode and the second electrode.

8. The method of claim 3, wherein predicting the second location includes:
    determining a distance from the conducted electrical weapon to the target; and
    calculating the second location based on the distance.

9. The method of claim 1, wherein determining whether the predicted first location and the predicted second location correspond to the suitable locations comprises determining a distance between the predicted first location and the predicted second location.

10. The method of claim 9, wherein determining whether the predicted first location and the predicted second location correspond to the suitable locations comprises determining the predicted second location does not correspond to the suitable location when the distance is less than a threshold.

11. The method of claim 9, further comprising:
    transmitting, by the conducted electrical weapon, indicia regarding an angle between a bore of the conducted electrical weapon that houses the first electrode and a bore of the conducted electrical weapon that houses the second electrode; and
    receiving, by the camera system, the indicia regarding the angle, wherein determining the distance comprises determining the distance based on the indicia regarding the angle.

12. The method of claim 1, wherein the camera system comprises a camera coupled to a drone.

13. The method of claim 1, wherein determining whether the predicted first location and the predicted second location correspond to the suitable locations on the body of the target comprises predicting, based on past patterns of movement, when movements of the target and movements of the conducted electrical weapon will provide an opportunity to launch the first electrode and the second electrode to impact the suitable locations on the body of the target, wherein the message is transmitted in accordance with the opportunity to launch.

14. The method of claim 1 further comprising automatically adjusting, by the conducted electrical weapon, a trajectory of one or more of the first electrode and the second electrode in response to the instruction.

15. The method of claim 1, further comprising:
    detecting, by the camera system, objects in the image data prior to receiving at least one message from the conducted electrical weapon indicating that the conducted electrical weapon is projecting a laser sight and/or prior to detecting a laser spot in the image data; and
    determining whether the predicted first location and the predicted second location correspond to the suitable locations in accordance with detecting the objects.

16. The method of claim 1, further comprising receiving, by the camera system, a direction of orientation of the conducted electrical weapon, wherein the predicted second location is determined directly based on the received direction of orientation.

17. The method of claim 1, wherein determining whether the predicted first location and the predicted second location correspond to the suitable locations comprises detecting and identifying, by the camera system, clothing of the target.

18. A non-transitory computer-readable storage medium comprising instructions for improving delivery of one or more electrodes to a target that, when executed by a processing circuit of a camera, cause the camera to:

capture image data of the target via an image sensor of the camera;

determine a predicted first location of impact on a body of the target of a first electrode to be launched toward the target;

determine a predicted second location of impact on the body of the target of a second electrode to be launched toward the target;

determine whether the predicted first location and the predicted second location correspond to suitable locations on the body of the target;

provide a message to enable launch of the first electrode and the second electrode when the predicted first location and the predicted second location are determined to correspond to suitable locations; and provide an instruction to adjust at least one of the first electrode and the second electrode when the predicted second location is determined by the camera to not correspond to a suitable location on the body of the target.

19. The computer-readable storage medium of claim 18, wherein determining whether the predicted first location and the predicted second location correspond to suitable locations on the body of the target includes:

determining a distance to the target;

calculating a distance between the predicted first location and the predicted second location based on the determined distance; and determining the predicted second location to not correspond to the suitable location if the calculated distance is less than a threshold.

20. The computer-readable storage medium of claim 19, wherein:

determining the predicted first location includes detecting a position of one laser spot on the body of the target in the image data; and determining the predicted second location includes calculating the predicted second location based on the detected position of the one laser spot.

* * * * *